June 23, 1942.    O. S. FIELD    2,287,422
SYSTEM AND APPARATUS FOR OPERATING PRISON CELL DOORS
Filed July 12, 1939    9 Sheets-Sheet 1

INVENTOR
O. S. Field,
BY Neil W. Fleton,
his ATTORNEY

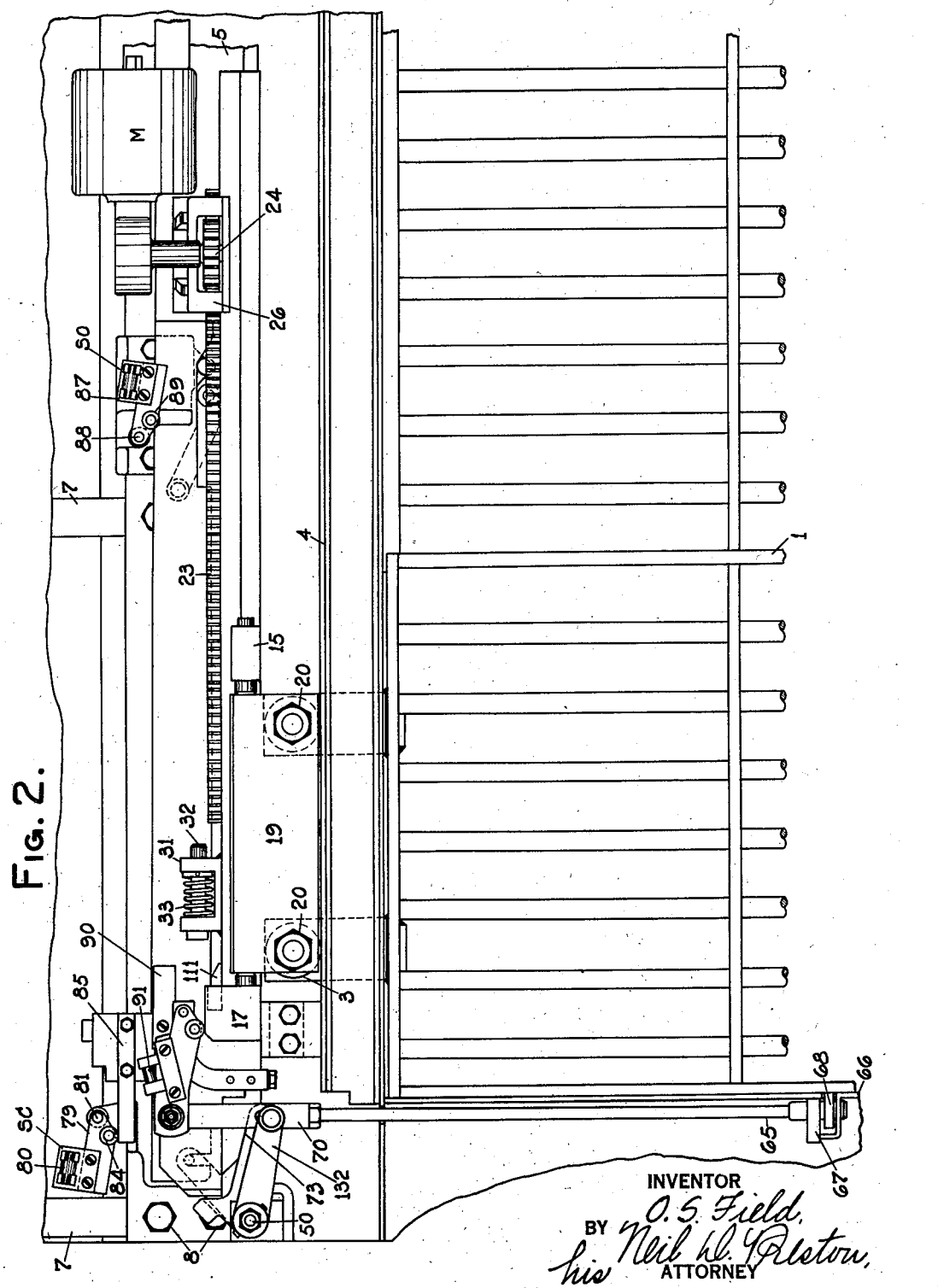

June 23, 1942. O. S. FIELD 2,287,422
SYSTEM AND APPARATUS FOR OPERATING PRISON CELL DOORS
Filed July 12, 1939 9 Sheets-Sheet 3
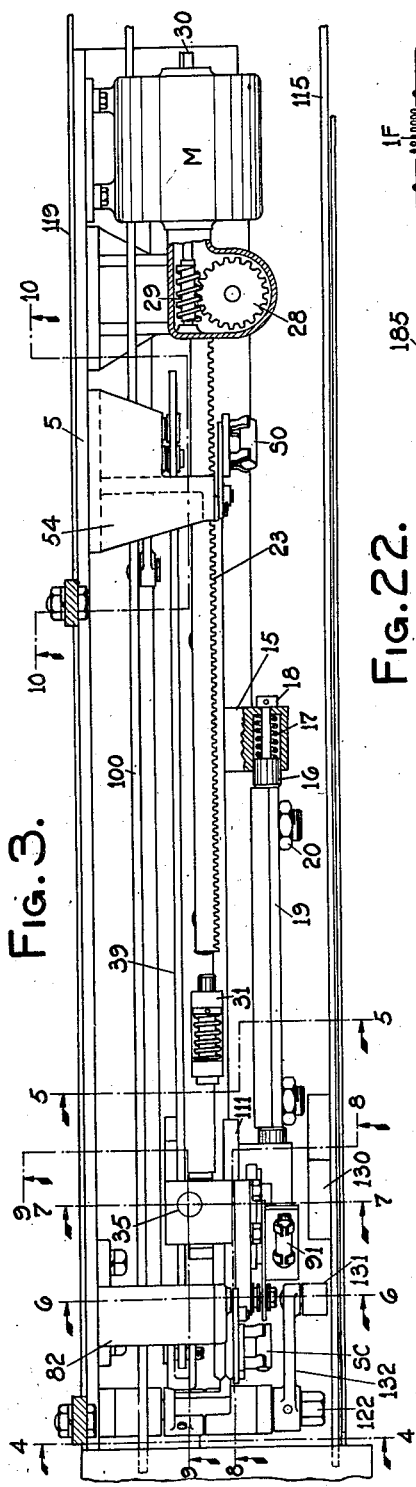
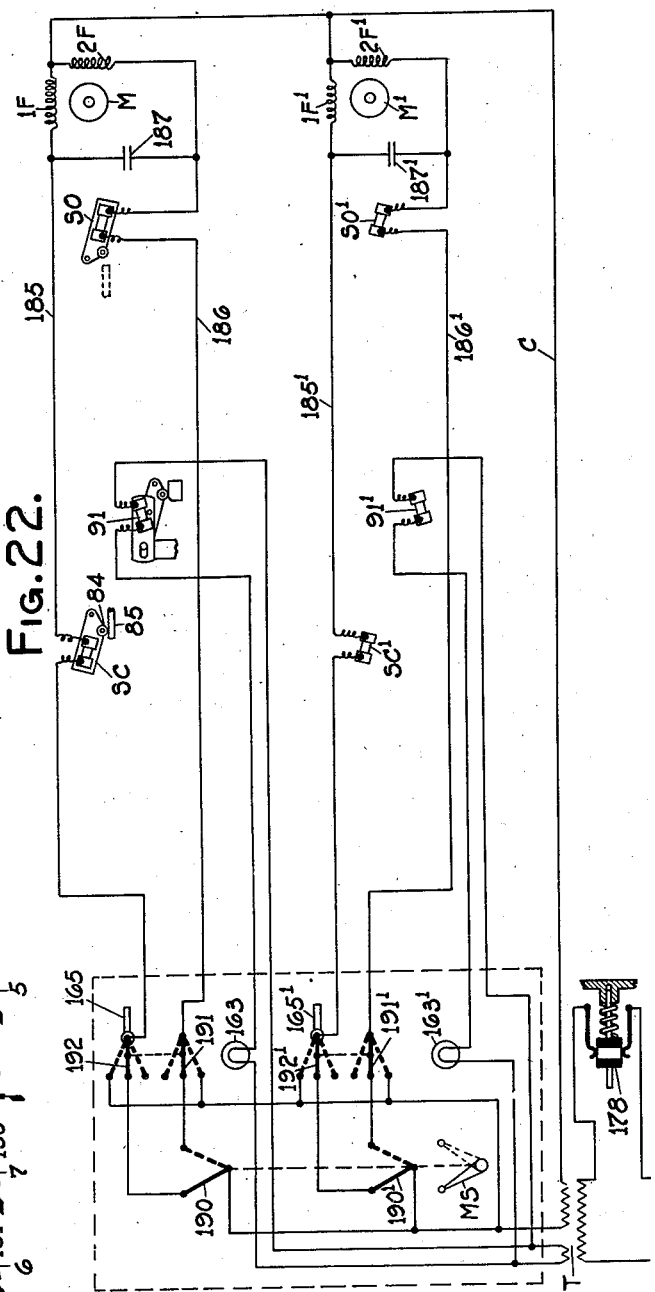
INVENTOR
O. S. Field,
BY
ATTORNEY

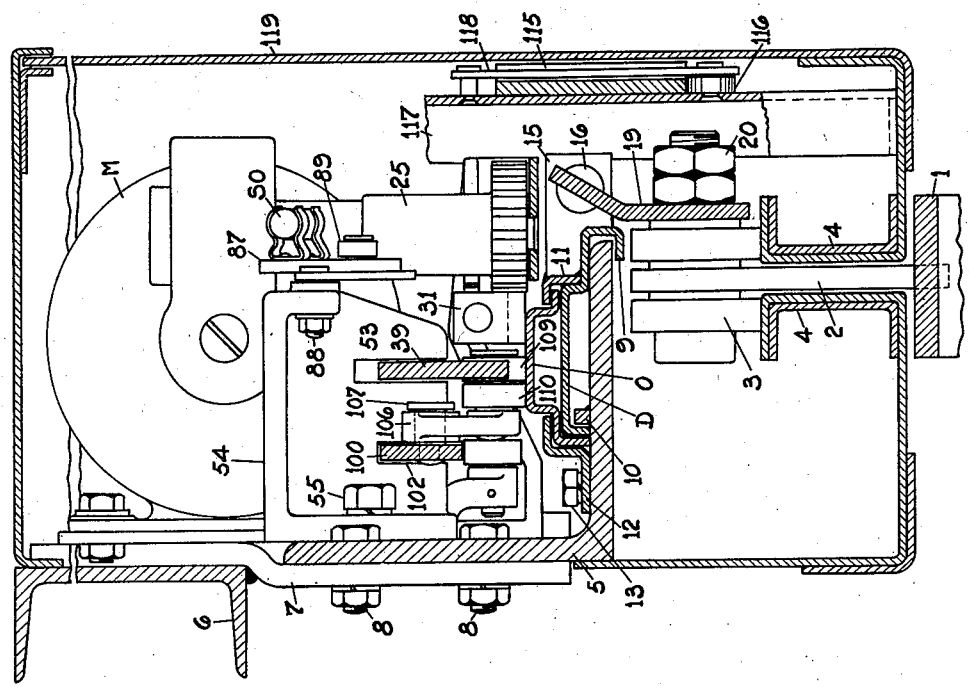
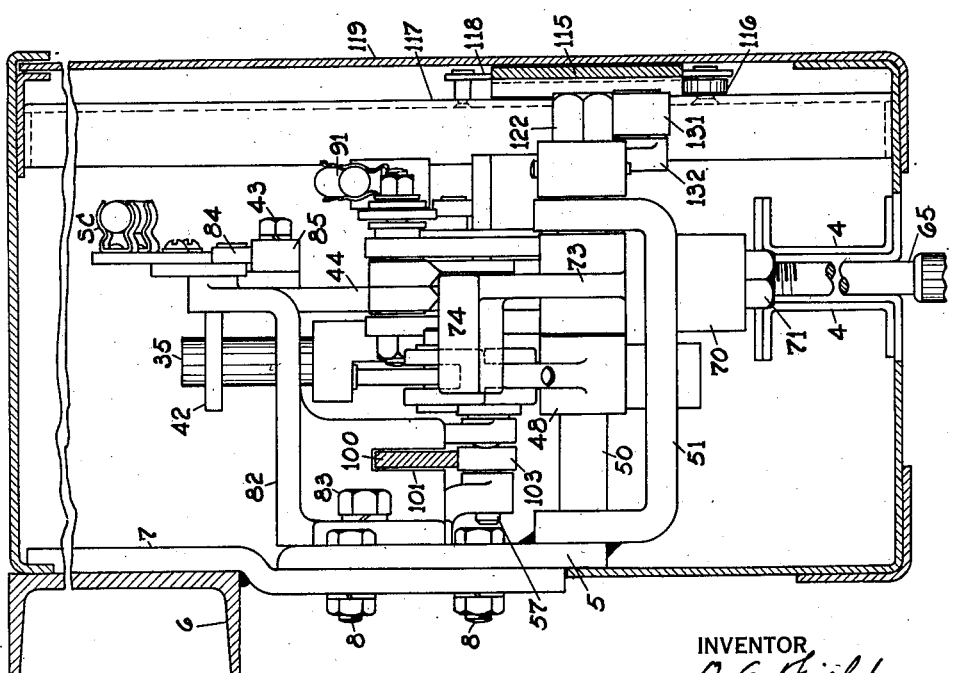

June 23, 1942.  O. S. FIELD  2,287,422
SYSTEM AND APPARATUS FOR OPERATING PRISON CELL DOORS
Filed July 12, 1939  9 Sheets-Sheet 5

INVENTOR
O. S. Field,
BY Neil W. Preston,
his ATTORNEY

June 23, 1942.    O. S. FIELD    2,287,422
SYSTEM AND APPARATUS FOR OPERATING PRISON CELL DOORS
Filed July 12, 1939    9 Sheets-Sheet 6

INVENTOR
O. S. Field,
BY Neil W. Preston,
his ATTORNEY

June 23, 1942.   O. S. FIELD   2,287,422
SYSTEM AND APPARATUS FOR OPERATING PRISON CELL DOORS
Filed July 12, 1939   9 Sheets-Sheet 7
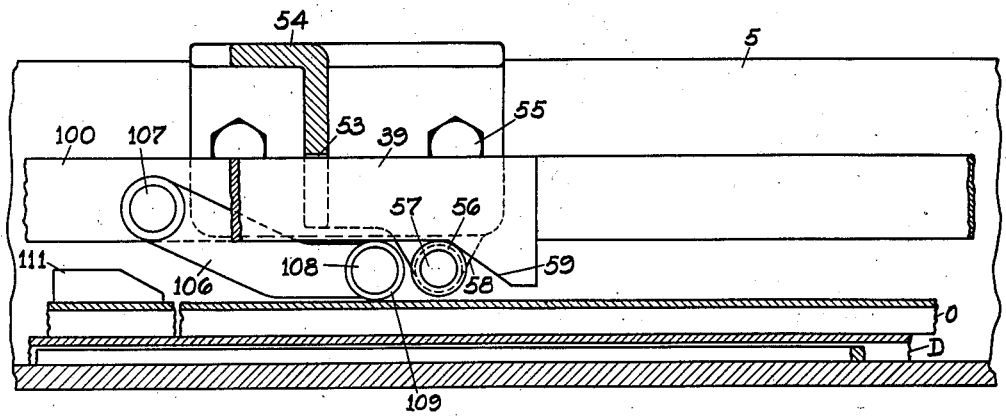
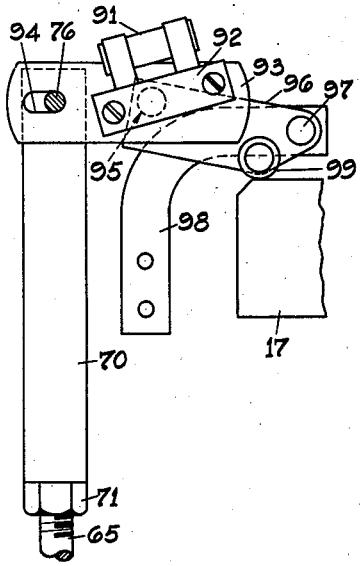
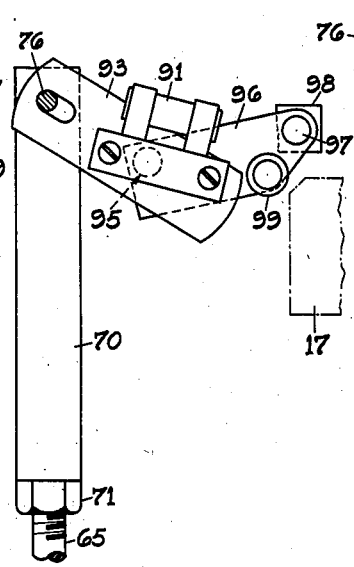
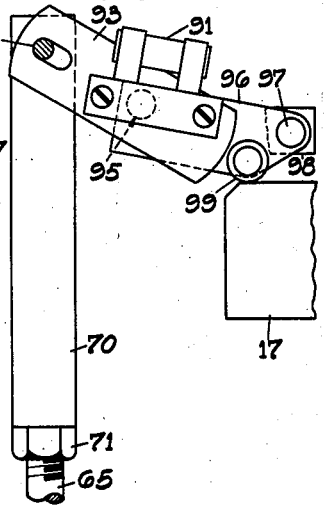
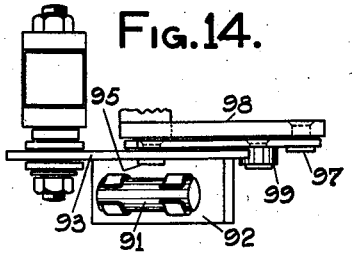
INVENTOR
O. S. Field,
BY Neil W. Preston,
his ATTORNEY June 23, 1942. O. S. FIELD 2,287,422
SYSTEM AND APPARATUS FOR OPERATING PRISON CELL DOORS
Filed July 12, 1939 9 Sheets-Sheet 8
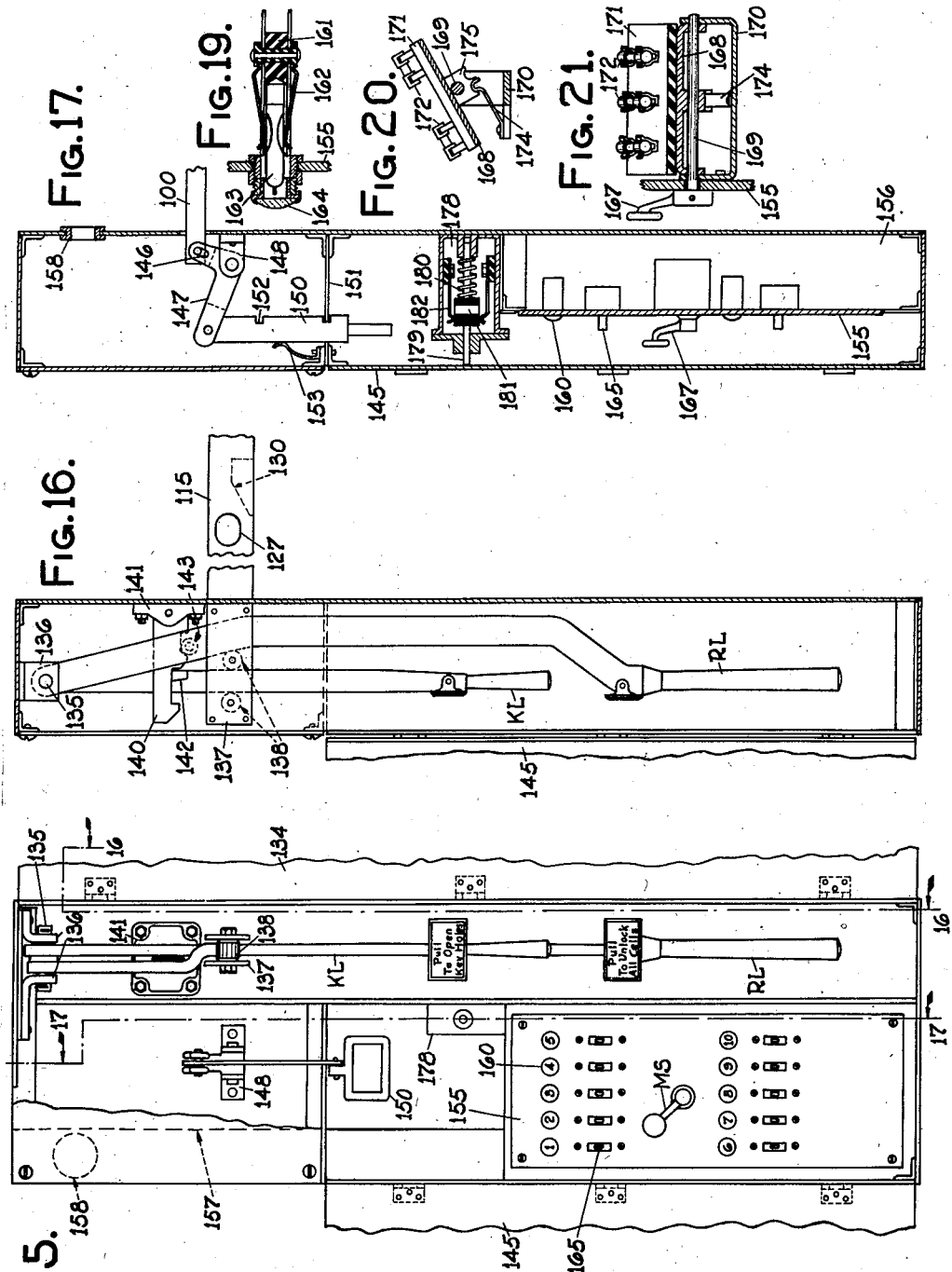
INVENTOR
O. S. Field,
BY Neil W. Preston,
his ATTORNEY June 23, 1942.  O. S. FIELD  2,287,422
SYSTEM AND APPARATUS FOR OPERATING PRISON CELL DOORS
Filed July 12, 1939   9 Sheets-Sheet 9
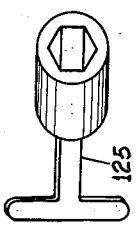
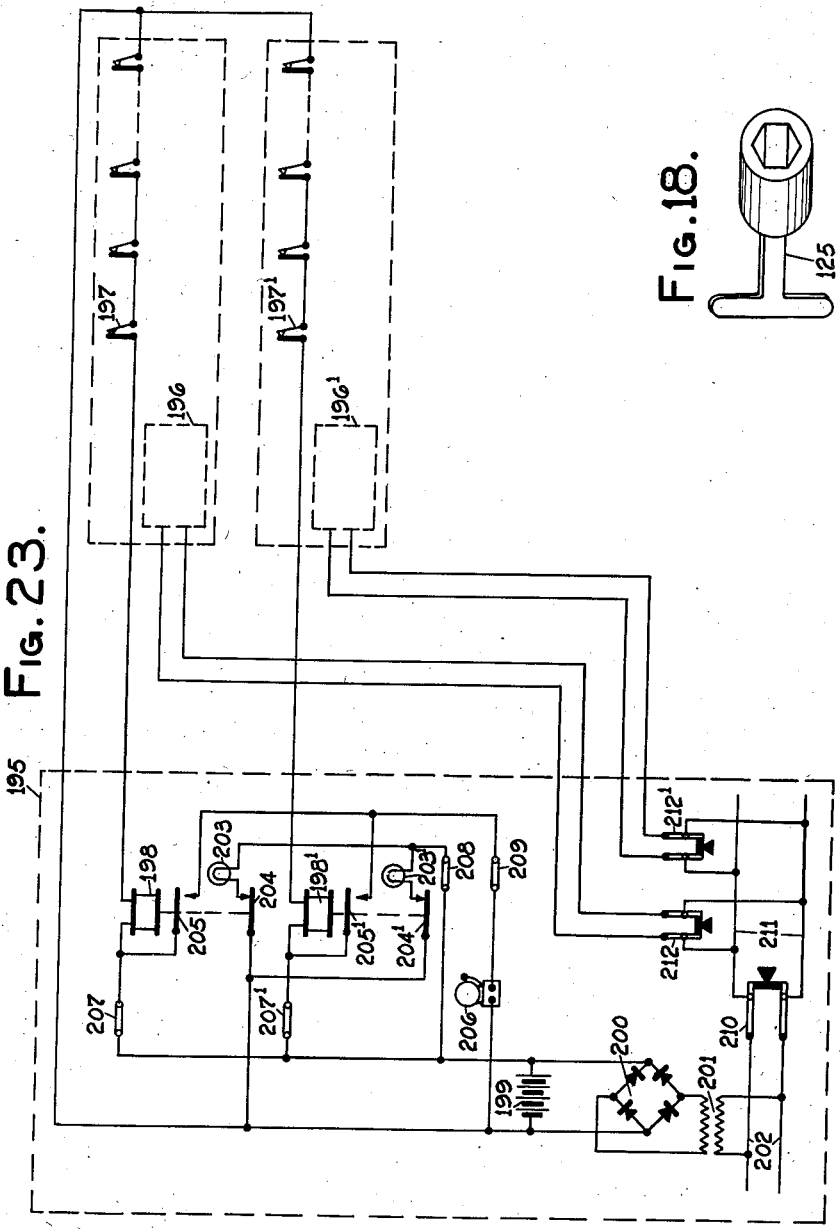
INVENTOR
O. S. Field,
BY Neil W. Preston,
his ATTORNEY Patented June 23, 1942

2,287,422

UNITED STATES PATENT OFFICE 2,287,422

SYSTEM AND APPARATUS FOR OPERATING PRISON CELL DOORS

Oscar S. Field, Rochester, N. Y., assignor to General Railway Signal Company, Rochester, N. Y.

Application July 12, 1939, Serial No. 284,077

48 Claims. (Cl. 189—7)

This invention relates to a system and apparatus for the supervisory manual control from a suitable remote control point of the power and manual opening and closing movement and locking of prison cell doors.

In the typical prison contemplated in accordance with this invention, the cells are usually arranged in blocks or tiers with sliding doors opening into a corridor; and it is desirable that a guard stationed at one end of the corridor, usually in some protecting cage or enclosure, or at some other suitable control point, should be able to unlock and open, or close and lock, the doors of the cell block individually, or in some selected group, or all at the same time, as occasion may require. For example, when the prisoners are to be released for work or otherwise, the guard may wish to let out and open from his station all of the cell doors of the tier at the same time, or only some of the doors for cells then occupied, or perhaps only some of the doors of the occupied cells to leave one or more prisoners confined while the others are released. Similarly, when the prisoners are marched to their cells, the guard may sometimes wish to close and lock by power all of the cell doors standing open at the same time, or at other times he may want to close and lock by power one or more of the doors standing open from time to time as these cells become occupied, or he may wish to have the doors free to be closed and locked by the prisoners. Further, occasion may arise where the guard may wish to let out or lock up one particular prisoner; and it is desirable that he should be able from his station to unlock and open, or close and lock, any selected one of the various cell doors in the block independently of all the others.

Various other conditions in prison operation and routine make it desirable to provide a system of supervisory manual control from a suitable protected control point by which any desired number or group of cells may be readily opened or closed, locked or unlocked, by power or by hand, safely and by a simple manipulation.

Various kinds of mechanical cell door operating and locking systems have been devised; but such systems involve various mechanical connections and are impracticable for long cell blocks, on account of the physical effort required for the manipulation, and the difficulties encountered in adjusting and maintaining the proper mechanical movements under variations in temperature and the accumulated lost motion between various connected parts.

With these considerations in mind, and speaking generally without attempting to define the nature and scope of this invention, it is proposed to provide a unitary power mechanism for each cell door which may be controlled electrically from any desired control point and set into operation to unlock and open, or close and lock, the corresponding cell door, and to arrange electrical control circuits with a master control switch and with individual control switches one for each door in such a way that the power mechanisms for the several doors of a cell block of any desired length may be set into operation individually, or in any group as may be selected from time to time, thereby attaining a facility in a supervisory manual control of the power operation and locking of cell doors adequate for the various conditions and requirements of prison operation.

This unitary operating mechanism for each cell door comprises in general an electric motor and associated gearing and operating parts which may be controlled electrically from a suitable remote control point to unlock and move the door to its open position, holding it in its partially or fully open position, and also to close the door and hold it in its closed position, as well as automatically operate the usual locking device, such power closing being accomplished in a manner to avoid any severe shock and jar, and occurring at such speed and with such a driving force as are not likely to injure a prisoner who may get caught in the door, or tries to obstruct its closing. The operating mechanism of this invention has other structural features and operating characteristics which will be explained hereinafter in connection with the description of the specific embodiment of the invention disclosed.

In connection with such remote control of the power operation and locking of prison cell doors, it is desirable that the closed and locked condition of the various doors should be effectively and reliably indicated at the remote control point for the information of the guard; and suitable indication means for this purpose is provided in accordance with this invention, preferably by lighting small indicating lamps on a control panel identified with the respective cells by number designation or the like, when the corresponding door is fully closed and locked, such indicating lamp for each door being extinguished when that door is not locked nor fully closed.

Under some circumstances, as for example, in the case of derangement of the operating mechanism for a door, or in connection with some part of the prison routine, it may be necessary or expedient to unlock an individual door, and also disengage it from its operating mechanism irrespective of its position, by manipulation of a key device, so that this door may be opened or closed by hand independently of all other doors when occasion requires. In order that such a key device may not be used improperly by some prisoner, it is proposed in accordance with this invention to arrange so that it is possible to use such a key device for any door only if such use is permitted by appropriate manual manipulation by the guard or other authorized person at the point of remote control. More specifically, the system of this invention comprises a master sliding bar extending the length of the cell block and operable manually only from the point of remote control so as to cover and uncover a hole adjacent each cell, and thus make it possible to insert and use the key device to unlock the corresponding door and free it from its operating mechanism.

In connection with the power unlocking and operation of prison cell doors under remote electrical control as contemplated, there is a further consideration that emergency conditions may arise, such as a fire accompanied by a power failure, where it is desirable to unlock and free all of the doors of a cell block simultaneously for hand operation, by a mechanical operation independently of the power supply. In accordance with this invention, it is proposed to provide for such emergency release of the doors by a master release bar extending the length of the cell block, which may be operated manually from the remote control point and which is effective mechanically by its movement independently of power supply to unlock all of the doors and disconnect them from their operating mechanisms, so that they may be opened manually by the prisoners in case of an emergency.

In the specific embodiment disclosed, the construction is simplified and cheapened by employing the same master sliding bar in one operated position to uncover the holes to receive the key device for the manual release of the individual doors, and in another operated position to provide for the emergency unlocking and disconnection of all of the doors. In this connection, provision is made so that variations in the extent of movement of this master bar at different points in its length, due to lost motion, expansion contraction by variations in temperature, or the like, will not interfere with the desired mechanical operations performed by this bar with respect to each of the doors in the cell block.

The operating mechanism contemplated includes a non-reversible gearing in the drive between the motor and the door, so that the door is held in its closed position by the mechanism independently of the regular lock, thereby affording an additional safeguard in keeping the door closed. With such non-reversible gearing, the operating mechanism acts to hold the door in its open position, as well as in the closed and intermediate positions. There may be situations, however, where it is considered desirable for some reason to have the door free from the operating mechanism in its open position so that it may be closed by hand by the guard or prisoner, as for example, when it is desired to require the prisoners to close their own cell doors when marched in to be locked up.

Accordingly, it is proposed in accordance with the invention to provide means manually controlled from the remote control point to cause disengagement of all of the doors standing fully open from their operating mechanism when desired, so that these doors may be closed by hand, this being accomplished without affecting other doors that are partially or fully closed. When any door is thus closed by hand, its lock is automatically engaged; and the door remains locked until unlocked by the operating mechanism, key device, or emergency manual release.

In connection with such release of the doors in their fully open position, or disconnection of the door from its operating mechanism by use of a manual key device, or by actuation of the master emergency release, whenever the operating mechanism for such disconnected door is subsequently moved to the open or closed position, as the case may be, it is operatively connected again automatically to the door, irrespective of the position in which it may be standing, so that the operating mechanism can be used thereafter to actuate the lock and move the door by power in the normal manner.

Other characteristic features, attributes, and advantages of the invention will be in part apparent and in part explained as the description progresses.

In the accompanying drawings, Fig. 1 is a diagrammatic and perspective illustration of the general organization and construction of the door operating mechanism of this invention as applied to one cell door, together with the associated master bars and operating levers, the parts being shown in a manner to facilitate an understanding of the structural arrangement and operation rather than in their true form and relationship used in practice.

Fig. 2 is a front view or elevation of the operating and locking mechanism; Fig. 3 is a general plan view; Figs. 4, 5, 6, and 7 are vertical transverse sections through the operating mechanism assembly along the lines 4—4, 5—5, 6—6, 7—7 in Fig. 3.

Fig. 10 is another fragmentary section along the line 10—10 in Fig. 3 illustrating certain parts associated with the optional feature of freeing the door in its open position.

Figure 1:
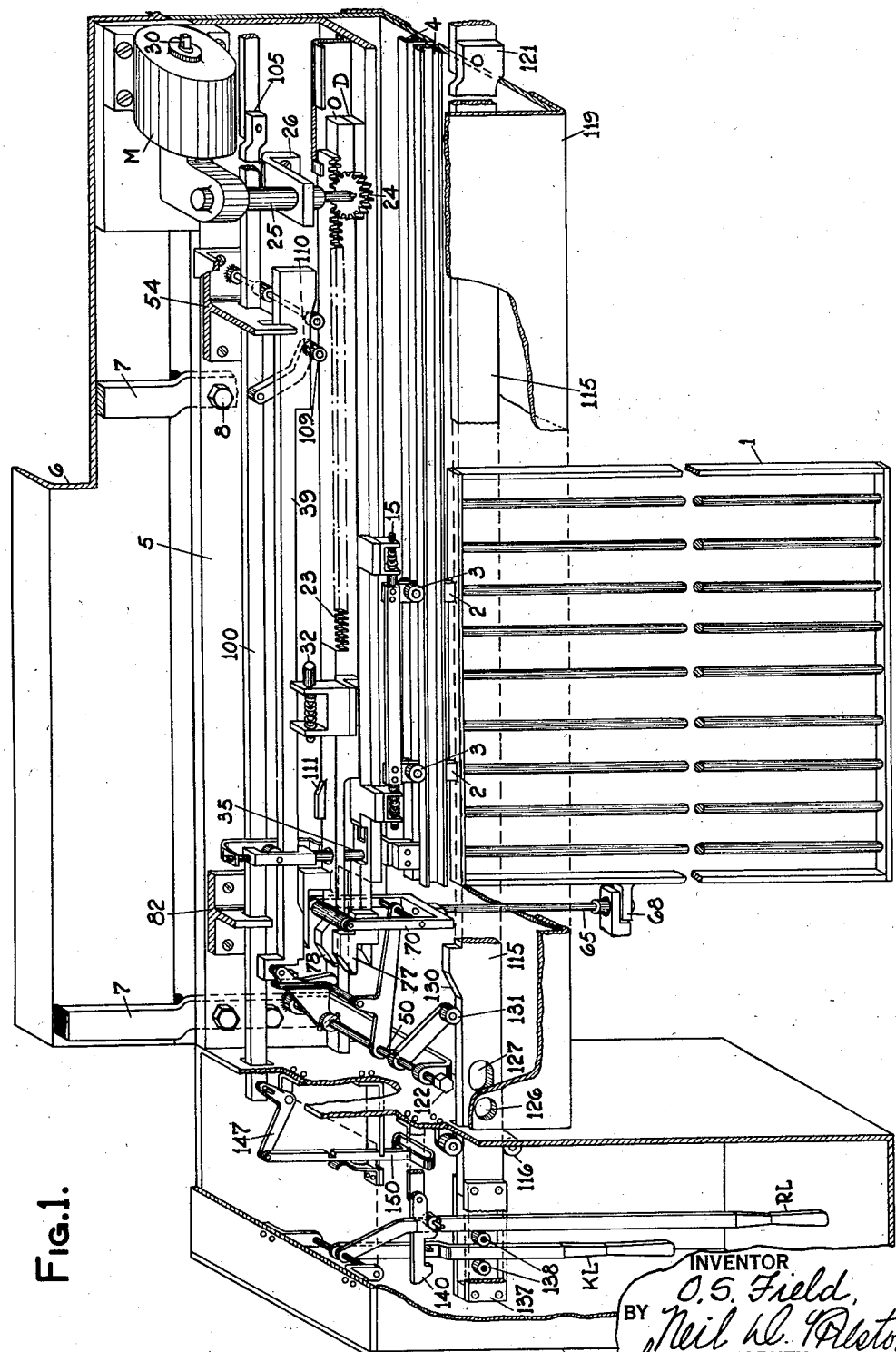

Figs. 11, 12, 13, and 14 are fragmentary views illustrating the arrangement of parts and operation of the contact device for closing a circuit to an indicating lamp only if the door is fully closed and locked.

Fig. 15 is an elevation of the control cabinet at the central control point, with the upper portion partly broken away and with the cabinet door in the open position.

Figs. 16 and 17 show vertical sections of the control cabinet taken on the lines 16—16 and 17—17 respectively in Fig. 15.

Fig. 18 is a view of the kind of manual key device contemplated for use by the guard to unlock and release an individual cell door when desired; Fig. 19 is a fragmentary sectional view of one of the indicating lamp sockets; and Figs. 20 and 21 are fragmentary views illustrating one construction of the master switch.

Fig. 22 is a diagrammatic circuit plan of one preferred arrangement of the control and indication circuits for the doors of a cell block; and Fig.

23 is a circuit diagram illustrating one form of centralized power control and indication for which the invention is adapted.

The system and apparatus for operating prison cell doors in accordance with this invention may be applied to various types of cell block construction; but the specific embodiment illustrated is arranged to conform with the typical or conventional cell block construction involving the usual fixed cell fronts, sliding doors, corner posts or pilasters, and a casing or chaseway of suitable structural form extending the length of the cell block above the doors. It is contemplated that the operating mechanisms for the several doors in the block will be mounted in this casing above the doors and wholly enclosed and protected, the front cover for this casing being removable in sections to give access to the mechanism, such covers being locked by a suitable mechanical device (not shown) releasable from the control cabinet at the end of the cell block in accordance with the usual practice.

The general cell structure with the casing and door support illustrated is merely a typical or representative application of the invention. As shown, the cell doors 1 of the usual sliding type are supported by hangers 2 which extend through an opening in the bottom of the casing and carry rollers 3 running on track 4 in the usual way.

Generally speaking, the system of this invention comprises a separate and unitary power operating mechanism for each door, electrically connected by suitable control circuits to a master control switch, and individual control switches one for each door, and by suitable indicating circuits to indicating lamps, all mounted on a control panel in a cabinet or compartment located at the end of the cell block, and suitably housed and protected so as to be accessible only to authorized persons. In addition to such unitary cell door operating mechanism, with their supervisory control and indicating circuits, the system of this invention also includes a master release slide bar extending the length of the cell block inside the casing above the doors, which is connected to hand levers in the control cabinet and arranged to be operated to different positions for the purpose of uncovering the holes associated with the respective doors to permit use of the key device for manual unlocking and release of the doors individually, and for the emergency unlocking and release of all of the doors simultaneously. As illustrated, the invention also includes another master selector bar operable from the control cabinet to determine whether the doors shall be free or held in their open positions.

*Door operating mechanism.*—Considering first the construction of the unitary power mechanism for each door, only one of these mechanisms has been illustrated, and it should be understood that the same mechanism is provided for each of the various doors of a cell block, or other group of doors under the supervisory manual control from the same control point, these various mechanisms being the same and being electrically connected with the indicating lamps and individual control switches, as well as to a master control switch.

The unitary power operating mechanism of this invention is wholly mounted and supported by one member, such as an angle iron support 5 which is secured in a suitable manner to the rear wall of the casing above the doors. As illustrated, it is assumed that the rear wall of this chaseway includes a channel member 6 to which are welded supporting bars 7; and the main angle iron support 5 is fastened to the supporting bars by bolts 8. This is merely illustrative of one application of the invention; and the specific way in which the main angle iron support 5 for the door operating mechanism is secured in the chaseway above the cells will, of course, have to be adapted to the particular prison structure for different installations.

This operating mechanism comprises two sliding bars or members, termed a door slide D and an operating slide O, which are supported on the angle iron support 5 for free sliding movement relative to each other and with respect to said support for a distance corresponding with the door travel. In the particular construction illustrated, these sliding members are formed of sheet metal of the appropriate thickness, and are guided and supported on each other and on the angle iron support in a sliding relation in a manner best shown in Fig. 5. The lower or door operating slide D is formed with a flange 9 along the front edge, hooked over the edge of the angle iron support 5 and a down-turned flange at the rear edge resting on the upper face of the horizontal leg of the angle iron support, a square guide block 10 welded or otherwise suitably fastened to the angle iron support acting to prevent lateral displacement of this slide. The upper or operating slide O is formed with down-turned guiding flanges at the edges resting on the angle iron support 5 and the lower door slide, and is guided at the front edge by an angle strip 11 welded to the door slide D, and at the other rear edge by a detachable Z-shaped bar 12 fastened by tap 13 to the angle bar support 5.

This particular detail construction for obtaining a door slide D and an operating slide O relatively movable and in a superimposed relation merely represents one suitable construction for this purpose; and it is evident that other shapes and mountings for sliding members may be employed.

The lower or door slide D is operatively connected to the door hangers 2 with a yieldable or spring buffer arrangement. In the specific construction illustrated, blocks 15, each supporting a spring buffer, are fastened by welding or otherwise to the door slide D at spaced points. Each of these spring plungers in the form illustrated in Fig. 3 comprises a plunger 16 with an enlarged head guided in a recess in the block 15 and extending through a hole in the block. This plunger is pressed outward by a compression coil spring 17 interposed between the enlarged head of the plunger and the bottom of the recess in the block, the plunger being held in place by a collar 18 pinned to its outer end. The spring 17 is preferably compressed during assembly to have an initial compression.

The spring actuated plungers 16 of these spring buffers engage opposite ends of a plate 19 fastened to the door hangers 2 by nuts 20 on the same bolts for the wheels of the door. It is contemplated that the plate 19 may be bent or shaped as required for a given installation to bring its upper edge in alignment with the plungers 16 of the spring buffers attached to the door slide, regardless of variations in the relationship between the door hangers and the back wall of the casing to which the operating mechanism is attached. In this way, the same operating mechanism is applicable to various cell structures merely by changing the dimensions or shape of the plate 19. Also, this construction permits a limited amount of free movement laterally of the door hangers relative to the door slide, and thus makes it unnecessary to have accurate alignment of the door slide with respect to the door movement.

The other or operating slide O has a rack bar 23 of conventional form spot welded or otherwise suitably fastened thereto along its edge; and this rack bar engages with a pinion 24 on a drive shaft 25 supported near its lower end in a bracket 26 fastened to the angle iron support 5. The upper end of this shaft is guided and supported in a gear casing inclosing a tyical worm gear 28 meshing a pinion 29 (see Fig. 3) connected to the armature shaft of the motor M suitably bolted to an extension on the angle iron support 5. The end of this armature shaft is preferably extended beyond the casing of the motor and squared as indicated at 30 to receive a wrench or wheel by which the mechanism may be operated by hand for the purpose of test or adjustment.

The operating slide O also has fastened thereto by welding or otherwise a block 31 forming spaced ears in which is slidably supported a plunger 32 urged in one direction by a compression coil spring 33 which engages a collar pinned to said plunger in the manner illustrated in Figs. 2 and 3. This spring pressed plunger 32 is positioned so as to engage the bracket 26 supporting the drive shaft 25, and thus arrest the movement of the operating slide O, and also the door if connected thereto, in the door opened position.

Figure 9:
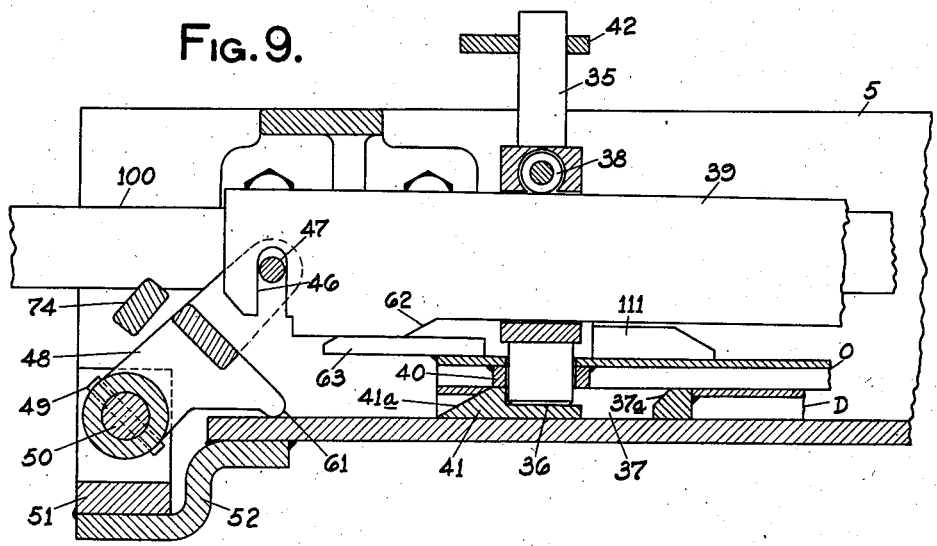
Fig. 9 is a fragmentary vertical section along the line 9—9 of Fig. 3 illustrating certain details of construction associated with the means for coupling and uncoupling the motor driven mechanism to the cell door.

The door slide D to which the door is operatively connected, and the operating slide O driven by the motor M, while they may slide relatively to each other under certain conditions, are arranged to be operatively connected with a limited amount of lost motion by a device, conveniently termed a coupling bolt 35, which is supported by and moves with the upper operating slide O and which may engage with the end of a recess 36 and in a hole 37 in the door slide D, in a manner best illustrated in Fig. 9, said coupling bolt carrying the roller 38 which rides on a lift bar 39, so that the bolt may be raised or lowered in different positions of the door by an upward movement of this lift bar.

Referring to the specific details of the construction illustrated, the lower portion of the coupling bolt 35, circular in cross section passes loosely through a hole in the operating slide and a reinforcing block 40 welded to its lower face, the lower edge of this coupling bolt 35 being preferably beveled slightly to facilitate release of its door in the open position in the manner later explained and rests normally in the recess 36 in a reinforcing block 41 welded to the door slide D as shown in Fig. 9. This recess 36 in the reinforcing block 41 has a straight shoulder at one end with which the coupling bolt 35 engages for closing movements, and a hole 37 near the other end to receive the bolt, the edge of the recess adjacent said opening being preferably beveled as indicated at 37a in Fig. 9 for the purpose of facilitating disengagement of the bolt from the door in its open position. The leading or left-hand end of the reinforcing block 41 of the door slide is formed with a beveled or inclined face as indicated at 41a in Fig. 9, so as to raise the coupling bolt 35 from its lower-most position when the door is closed manually with the operating mechanism in its closed position.

Figure 7:
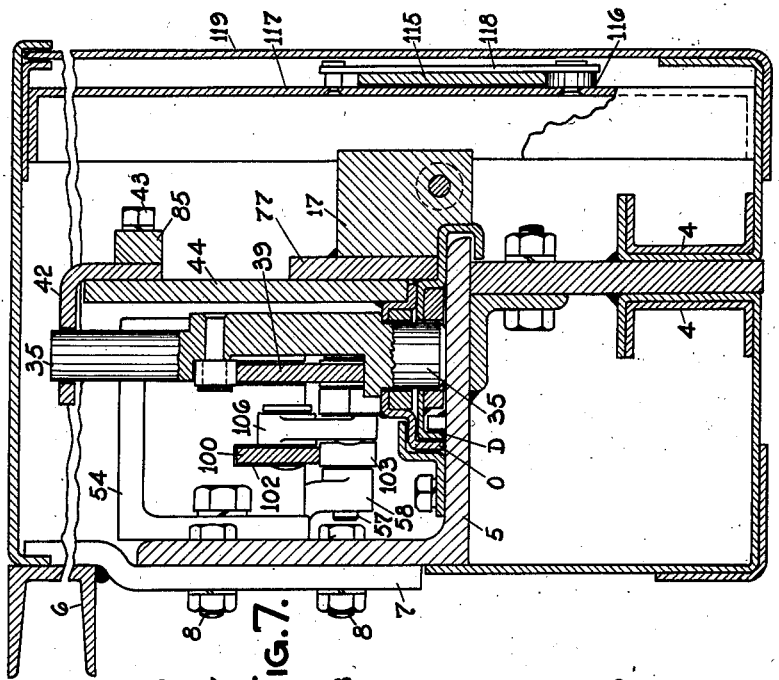

The upper end of the coupling bolt 35 is circular in cross section and guided by a bracket 42 attached by bolts 43 to the member 44 fastened to the operating slide O (see Fig. 7). The intermediate portion of the coupling bolt 35 is rectangular in cross section and is formed with a recess to receive the lift bar 39; and a roller 38 fastened to the bolt 35 by a rivet pin or the like rides on the upper edge of this lift bar.

The lift bar 39 for operating the coupling bolt 35 has a notch 46 at one end fitting over a pin 47 (see Fig. 9) in the bifurcated end of a crank arm 48 (see Fig. 3); and this crank arm 48 is fastened by a pin 49 to a transverse shaft 50 that is supported near its ends in a U-shaped bracket 51 welded to the angle iron support 5 (see Fig. 4), with a reinforcing support 52 also welded to said bracket and said angle iron support (see Fig. 9).

The lift bar 39 is guided at its other end in a notch 53 in a bracket 54 fastened by bolts 55 to the angle iron support 5; and this end of the lift bar rests on a roller 56 (see Fig. 10) loose on a stud shaft 57 (see Fig. 4) secured to an extension 58 of the bracket 54. The lower edge of the lift bar 39 is formed with a cam surface 59 (see Fig. 10) adapted to engage this roller 56 and thus raise the lift bar bodily when it is moved endwise.

The crank arm 48 supporting one end of the lift bar is formed with a foot 61 (see Fig. 9) which functions as a stop to limit the downward movement of this crank arm in clockwise rotation of the shaft 50 by engagement with the horizontal leg of the main angle iron support 5.

One function of the lift bar 39 is to raise the coupling bolt 35 and disconnect the door slide D from the operating slide O to free the door for hand operation; and this is accomplished by turning the shaft 50 counterclockwise by a manual key device or by the emergency release bar, in a manner later explained, thereby rocking the crank arm 48 to lift the left-hand end of the lift bar 39 and also move it endwise with a substantially parallel motion, and raising the coupling bolt 35 irrespective of the position in which the door may be standing.

The lift bar 39 is also automatically operated by the operating mechanism during a limited movement of the door near its closed position to cause a partial movement of the coupling bolt 35, so that a limited amount of lost motion between the operating slide O and the door slide D is available near the closed position of the door for the purpose of operating the lock bolt, and yet the operating slide and door slide are directly connected without such lost motion during the opening and closing movement of the door and also while the door is open, for the purpose and in the manner explained more in detail later in describing the operation. Considering the structure for accomplishing this function and referring to Fig. 9, the lower edge of the lift bar 39 near its left-hand end is provided with a bevel or cam face 62 to co-operate with the beveled end of a block 63 welded to the end of the operating slide O.

*Door locking means.*—Considering now the locking means for the door which is operated in connection with its opening and closing by the operating mechanism, the door lock illustrated is of the conventional type and comprises a vertically movable lock bolt 65 inside of the usual structural door post or pilaster indicated at 66. This lock bolt 65 has an enlarged and hardened steel head at the lower end guided in a bracket 67 fixed to the door post and adapted to enter a hole in a staple 68 attached to the door frame in the usual way. Since the lock bolt 65 is operatively raised during closing of the door by hand or power, in a manner later explained, neither the bolt or the staple need to be shaped like a door latch to cause the staple to lift the bolt.

The lock bolt or rod 65 is threaded at its upper end into the lower part of a bifurcated lock bolt actuator 70 (see Fig. 6) with a lock nut 71 to maintain the adjustment. This lock bolt actuator 70 is supported and pivotally connected by a pin 72 to the upper end of an angle lever 73 which is loosely mounted on the shaft 50 above mentioned (see Fig. 8), an integral lug 74 on this angle lever 73 projecting sidewise (see Fig. 4) to lie over the crank arm 48 above described for supporting and operating the lift bar 39. Thus, when the shaft 50 is turned by the key device or the emergency release bar, and the crank arm 48 moves counterclockwise to raise the lift bar 39 and actuate the coupling bolt 35, this crank arm 48 at the same time engages the lug 74 and rocks the angle lever 73 to raise the lock bolt actuator 70 and the lock bolt 65 connected thereto, thereby unlocking the door as well as disconnecting it from the operating mechanism.

The lock bolt 65 and its actuator 70 are also operated automatically during the initial opening and the final closing movement of the door by hand or power, so as to provide for positive locking and unlocking. For this purpose, the upper end of the lock bolt actuator 70 is provided with a roller 75 mounted on a bolt 76 passing through the bifurcation of the actuator (see Figs. 6 and 8); and this roller co-operates with the beveled edges or cam faces on two cam members or plates 77 and 78 arranged side by side and welded or otherwise rigidly fastened to the door slide D and the operating slide O, respectively.

Figure 8:
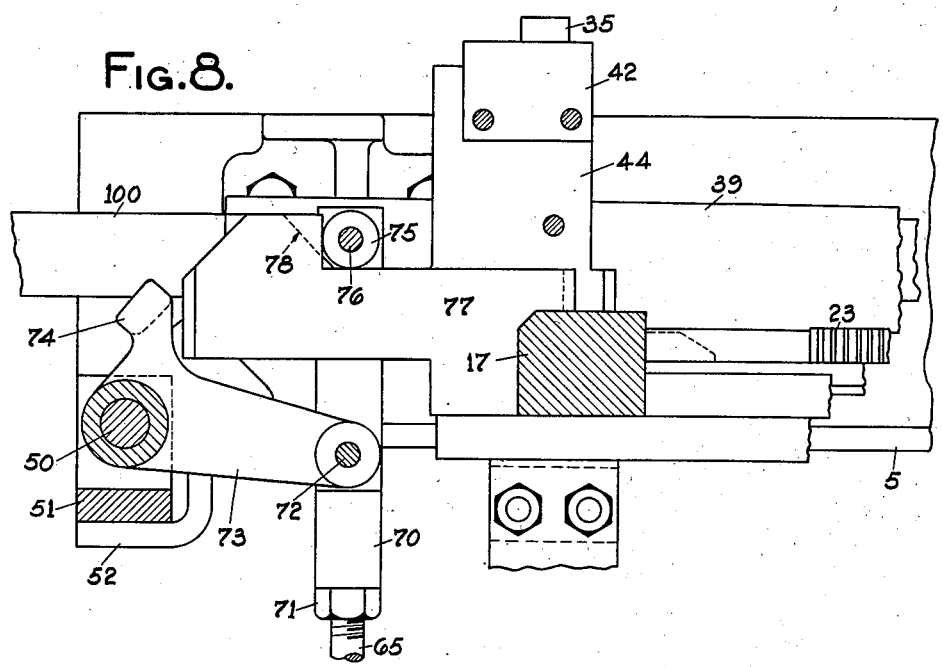
Fig. 8 is an enlarged fragmentary view along the lines 8—8 of Fig. 3 illustrating certain parts associated with the operation of the lock bolt.

The cam member 77 for the door slide D, as best shown in Fig. 8, has its front or left-hand edge beveled, and is formed with a square shoulder to engage the roller 75 when the door is fully closed and locked in the position shown in Fig. 8. It can be seen that this engagement of the roller 75 with the square shoulder of the cam member 77 attached to the door slide D constitutes a supplemental lock to hold the door in its closed position independently of the lock bolt 65 and staple 68, and also independently of the connection of the door to the operating mechanism with its non-reversible drive. The other cam member 78 attached to the operating slide O is formed with two beveled edges as best illustrated diagrammatically in Fig. 1, so that movement of this cam member in either direction raises the lock bolt.

These cam members 77 and 78 for automatically operating the lock bolt 65 move with the door slide D and with the operating slide O into and out of the space between the bifurcations of the lock bolt actuator 70, usually together under normal conditions but sometimes separately if the door is disconnected from the operating slide; and in order that these cam members 77 and 78 may be guided into this space independently of accurate alignment of the parts and variations in their movement, the front or left-hand edges of both of these cam members are preferably beveled to form relatively sharp edges as shown in the side view of Fig. 8 and in the end view of Fig. 4.

The movements of the parts involved in the automatic locking and unlocking of the door will be considered hereinafter, in connection with the description of the operation.

*Limit switches.*—In order to cut off the normal operating current at the appropriate point in the opening and closing movements of the door, limit switches automatically operated by the operating slide O are used. In an installation of the character under consideration, it will be evident that such limit switches are subject to adverse conditions in the accumulation of dirt, grease, and the like, and being enclosed with the operating mechanism in the casing above the cell doors are not readily accessible for the cleaning and maintenance necessary to keep exposed contact parts in good condition. Accordingly, it is proposed to employ wholly enclosed mercury type contacts for the limit switches in the apparatus of this invention to assure reliable contact operation for long times without attention.

These enclosed mercury contactors contemplated are of the usual type comprising a hermetically sealed glass or metal tube containing a globule of mercury adapted to connect a pair of electrodes sealed in the tube when it is tilted, said tube being preferably filled with an inert gas to avoid the accumulation of mercury vapor. This tube is preferably formed with its electrodes connected with metal caps like in the ordinary cartridge fuse, so that the mercury contactor as a whole may be supported in spring clips of the usual type and readily removed for replacement. These clips, in which the mercury contactor is inserted, are preferably secured to blocks of suitable insulating material, with binding posts (not shown) for the attachment of external wires; and these insulated blocks are fastened to pivotally supported members having rollers engaged by actuating bars carried by the operating slide.

In the case of the limit switch SC for the closed position of the door (see Figs. 2 and 4), the member 79 carrying the mercury contact tube 80 is pivoted on a pin 81 in the bracket 82 fastened by bolts 83 to the support 5, and its roller 84 is engaged by an actuating bar 85, which is adjustably connected by the bolts 43 passing through elongated openings therein to the bracket 44 attached to the operating slide O and supporting the coupling bolt 35 (see Figs. 2 and 7). When the operating slide O carrying its bracket 44 and the actuating bar 85 reaches the appropriate point in the closing movement of the door, it can be seen that the actuating bar 85 will strike the roller 84 and tilt the member 79 and the mercury tube 80 to the position shown, thereby opening the circuit. When the door is opened, and the actuating bar 85 moved out of engagement with the roller 84, and the member 79 falls by its own weight and tilts the mercury tube 80 into position to close the circuit. By adjusting the actuating bar 85 endwise, the point in the closing movement of the door at which the operating current to the motor is cut off may be accurately determined, so as to avoid undue shock or jar.

In the case of the other limit switch SO for the open position, its supporting member 87 is pivoted on a pin 88 fixed to the bracket 54 (see Figs. 2 and 5); and its roller 89 is engaged by a different actuating bar 90 adjustably fastened in a similar way to the bracket attached to the operating slide O. This limit switch SO is shown tilted down in position to close the circuit; but at the appropriate point in the opening movement of the door, the actuating cam 90 engages the roller 89 and tilts this switch to open the circuit.

*Indication contactor.*—In order that the guard at the remote control point may know when a door is fully closed and also properly locked, each door is equipped with an indication contactor of the same enclosed mercury contact type, which is arranged to be positioned by the movement of the door and the lock bolt actuator in such a way to be tilted to close a circuit only if the door is closed and locked.

Figure 6:
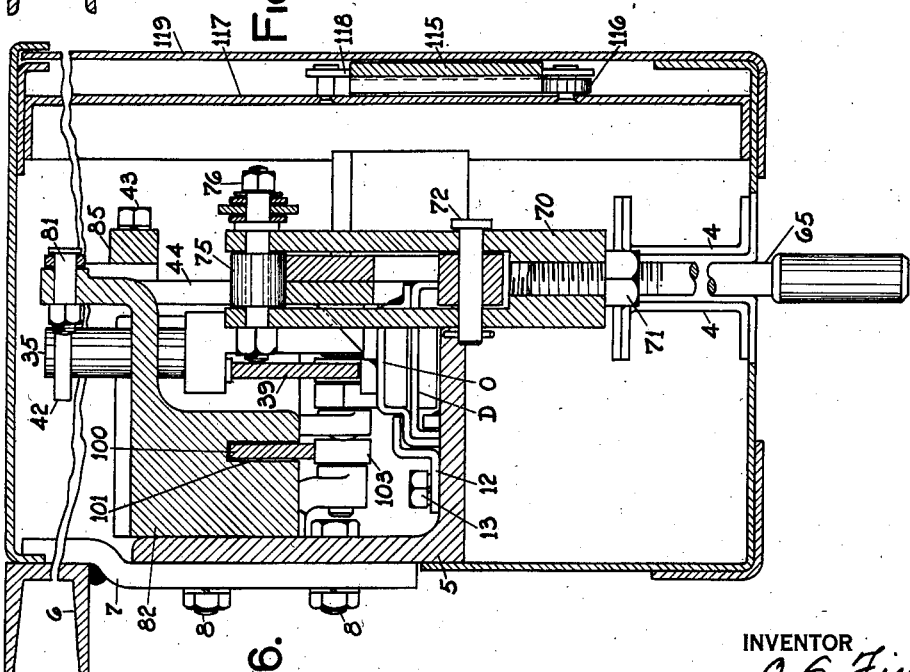

Referring more particularly to Fig. 2 and the fragmentary views of Figs. 11–13, the spring clips for the mercury contact tube 91 of the indication contactor are fastened to an insulated block 92, with suitable binding posts not shown, which in turn is secured by screws or the like to a plate-like member 93 having a slot 94 at one end around an extension of the bolt 76 in the upper end of the lock bolt actuator 70 (see Figs. 6 and 11). This member 93 carrying the mercury tube is also pivotally connected by a pin 95 to another plate-like member 96 pivotally supported on a stationary pin 97 in an extension arm 98 attached to the support 5. This other member 96 carries a roller 99 adapted to be engaged by the beveled edge of the left-hand block 17 secured to the door slide D and carrying the spring buffer.

The relative position of the parts of the indication contactor are shown in Fig. 11 for the door fully closed and locked. When the door is partially or fully open, so that the block 17 is out of engagement with the roller 99 and even though the lock bolt 65 is in its lower locked position, the two pivoted members 93 and 96 drop by their own weight to the position shown in Fig. 12, where the mercury tube 91 is tilted in the opposite direction from that shown in Fig. 11 to open the circuit. If the door is in a closed position, but the lock bolt is in its raised or unlocked position, the parts assume the relative positions shown in Fig. 13, where the tube 91 is tilted to open the circuit. If the door is open, and the lock bolt should also be raised, which is an abnormal condition, the member 93 carrying the mercury tube 91 would be merely tilted still more from the position shown in Fig. 12, keeping the indication circuit open.

This construction and arrangement of parts provides a simple and effective way to close or open an indicating circuit at one point dependent upon both the position and locked condition of the door; and since the contact means is fully enclosed, there is no chance for any dirt, oil, or corrosion of the contact surfaces to cause contact failures.

*Release for manual closing.*—Under certain circumstances it is desirable that the doors of a cell block when open should be disconnected from their operating mechanisms and be free to be closed by hand, while under other conditions it is desirable that the doors should be held in their open position. For example, in accordance with prison routine frequently adopted, when the prisoners are marched into the cell corridor to be locked up, each prisoner is required to close his own door; and under such circumstances the cell doors should be free to be closed by hand. On the other hand, when a guard enters the corridor to let out or lock up an individual prisoner, it is desirable that any cell door standing open should be held open to avoid the risk that the guard may be forced into a cell and locked up.

Accordingly, provision is made in accordance with this invention to enable the guard by manual actuation of a suitable master selector lever at the control point to determine whether the open door or doors shall be held in the open position, or shall be free to be closed by hand. For this purpose the operating mechanism for each cell includes a selector slide bar 100 near the rear wall of the mechanism casing, which is guided near one end in a notch or slot 101 in the bracket 82 as shown in Fig. 6, and is guided near the other end in a similar notch 102 in the other bracket 54 as shown in Figs. 7 and 10, this bar being supported on a free roller 103 alongside the roller 56 for the lift bar 39 and mounted on the stub shaft 57 in the bracket 54 (see Figs. 4 and 10). The selector bars 100 for the several cells are bolted or otherwise connected together as indicated at 105 in Fig. 1 to form a master bar extending the length of the cell block, these selector bars being sufficiently flexible to allow for slight variations in the alignment of the guiding notches and supporting rollers of the operating mechanisms and avoid binding under the relatively short distance of movement of these bars.

The purpose of this selector bar 100 for each door operating mechanism, when shifted from the normal position shown to an operated position, is to raise the lift bar 39 when the corresponding door is open, and thus disengage the coupling bolt 35 from the door slide D, so that the door is free from the operating mechanism and may be closed by hand. For this purpose, a curved arm or lever 106 is freely pivoted at one end on a suitable stud or pin 107 riveted to this selector bar 100, as shown in Figs. 5 and 10; and the other end of this arm 106 carries on a pin 108 riveted thereto two freely movable rollers 109 and 110 disposed side by side, one roller 109 under the lift bar, and the other roller 110 in a position to be engaged by an actuating cam block 111 with a beveled end (see Figs. 5 and 10) which is welded or otherwise secured to the operating slide O.

The means for manually shifting the selector bars 100 will be explained later in describing the control cabinet; but assuming that the selector slide bar 100 to be in the normal position as shown in Figs. 1 and 10, the relation of the parts is such that the cam block 111 on the operating slide O does not engage the roller 110, thereby leaving the lift bar 39 in its normal lowered position, with the door coupled to the operating slide and held in its open position by reason of the non-reversible gearing drive between the motor and the operating slide. However, if the selector bar 100 is pulled to the left from the normal position shown in Fig. 10, the roller 110 on the arm 106 moving with this bar is positioned so as to be engaged by the cam block 111 on the operating slide when the door has been operated to its open position. This raises the roller 110 carrying with it the roller 109 to raise the lift bar 39, and thus disengage the coupling bolt from the operating slide and free the door. In this operation the lift bar 39 is raised at its right-hand end and assumes a tilted position; but at that time the coupling bolt 35 is near the right-hand end of the lift bar and is disengaged by such tilted motion.

In this connection, the right-hand edge of the hole 37 in the door slide D is slightly beveled, as best shown at 37a in Fig. 9, and the lower end of the coupling bolt 35 is also beveled. This feature of construction is preferably employed in order that the door will be held sufficiently by the engagement of these beveled surfaces, when the coupling bolt 35 has been raised by the lift bar, to overcome any tendency of the door to gravitate toward its closed position, and yet a slight pull on the door will lift up the coupling bolt and free the door for hand closing.

By reason of this construction and arrangement of parts the guard is able to determine at will, by positioning the master selector bar 100, whether the door or doors operated to the open position shall be held in that position or be free for hand closing. The master selector bar 100 may be set in the operated position at the time one or more doors are to be opened by the power mechanism; and in this case the movement of the operating slide O by power raises the lift bar. If occasion should require, however, the guard may release the door or doors standing open by pulling the selector bar 100 to cause the roller 110 to ride along the beveled end of the cam block 111 and thus raise the lift bar. It will be evident that the position of the selector bar 100 has no effect upon any door that is closed, since the operating slide O must be moved to the fully open position to bring the cam block 111 into position to engage the roller 110 and also because only the right-hand end of the lift bar 39 is lifted.

In connection with this mechanical operation, it should be noted that the upward movement of the roller 110 to raise the lift bar 39 occurs as this roller rides the length of the beveled or inclined end of the cam block 111. Endwise movement of the selector bar 100 greater than this minimum produces no effect. In other words, it is not necessary to move the selector bar accurately a certain distance to accomplish the desired actuation of the lift bar, but merely any reasonable distance greater than such minimum; and it is evident that the parts may be proportioned so that the selector bars for all of the operating mechanisms throughout the cell block will be moved at least such minimum distance under the most unfavorable conditions of lost motion, or changes in the length of the individual bars by variations in temperature or the like.

*Key and emergency release.*—As previously noted, it is considered desirable to provide means to enable the doors to be individually unlocked or released manually by a key device, and also provide for the simultaneous unlocking and releasing of all of the doors for hand operation by the prisoners in the case of a power failure or other emergency. These different operations are preferably performed by moving the same master release bar extending the length of the cell block to different positions manually by appropriate hand levers in the control cabinet. This master release bar comprises a release bar 115 for each cell which is supported on rollers 116 on pins suitably attached to upright members 117 located at intervals in the length of the cell and secured to the top and bottom parts of the mechanism casing above the cell doors (see Figs. 4 to 7). This bar 115 is retained in place by strap members 118, and is located immediately behind the front cover 119 of the chaseway or casing. These release bars 115 for the several cells are bolted or otherwise connected together as indicated at 121 in Fig. 1, so as to form a master bar extending the length of the cell block, the individual bars being sufficiently flexible to compensate for variations in the alignment of their supporting rollers and brackets.

Considering first the provision for the manual key release of the individual doors, the end of the shaft 50, with which are associated the crank arm 48 operating the lift bar 39 and the angle lever 73 for operating the lock bolt, is formed at its outer end with a head 122 of hexagonal or equivalent cross section adapted to fit a key device 125 similar to a socket wrench, such as shown in Fig. 18, so that the shaft 50 may be manually turned by this key device. The kind of key device 125 disclosed is merely illustrative; and this device may take any suitable form adapted to be engaged with the end of the shaft 50 and permit turning it by hand. In this connection, it is contemplated that the key device will be ordinarily kept in the warden's office or other suitable place, where it can be obtained only by a special guard or other person authorized to use it, although any other suitable procedure may be adopted to safeguard the custody and possession of this key device so that it cannot be secured by a prisoner and used improperly.

The key device 125 is inserted through a hole 126 in the front cover of the mechanism casing as best shown in Fig. 1; and this hole is normally covered or obstructed by the release bar 115, so that until this release bar has been shifted from its normal position to its first operated position by manual operation from the control cabinet, to bring a hole 127 in this bar opposite this hole 126, the key device cannot be used. If, however, the release bar 115 has been operated, the key holes for all of the cells are unobstructed, and any person in possession of the key device 125 may go to any cell, and use the key device to turn the shaft 50. Such turning of the shaft 50 in a counter-clockwise direction as viewed in Fig. 1, rocks the crank arm 48, and by its engagement with the laterally extending lug 74 on the lever 73 also rocks that lever. This motion of the crank arm 48 raises the lift bar 39 to disengage the coupling bolt 35, and the movement of the lever 73 lifts the lock bolt actuator 70 to unlock the door.

It will be evident that the manual key device may be used to unlock any door or doors individually by hand when occasion requires, or release any door from its operating mechanism in the open or any intermediate position. Ordinarily, any selected cell door or doors may be unlocked and opened, closed and locked, or held or released in the open position by supervisory manual control of the power operating mechanism; but the manual key device affords an additional facility in the operation of prison cell doors which is useful in connection with the varying conditions for prison routine, or in the case of failure or derangement of the operating mechanism for a particular door.

Considering now the emergency release feature, the release bar 115 for each cell is provided with a cam block 130 welded or otherwise fastened to it in position to engage a roller 131 (see Figs. 1, 3, and 4) freely movable on a pin fastened to the lower end of a crank arm 132 secured to the shaft 50 by a pin or the like. When the release bar 115 is moved from its normal position shown, and beyond its first operated position in which the key holes are uncovered, to another or second operated position, the roller 131 is raised by the cam block 130, and the shaft 50 is rocked to raise the lift bar and lift the lock bolt actuator, thus unlocking and releasing the door the same as if the key device were used.

Thus, in the case of a fire accompanied by a power failure, or other emergency condition, when it is desired to unlock and release all of the doors of the cell block independently of the power mechanism, the manual movement of the master release bar 115 to its extreme position by a lever or equivalent in the control cabinet acts to unlock all of the doors and disconnect them from their power mechanisms, so that they may be opened by hand. This emergency release for all doors is entirely mechanical and hence may be used when no power is available. In the case of a power failure or other out of order condition effecting an individual door, it is contemplated that the manual key device 125 of Fig. 18 will be used for releasing a prisoner.

In connection with this master release bar, a cam block 130 co-operating with a roller 131 is used for actuation of the lift bar and lock bolt, and the holes 127 in this bar to uncover the keyhole are elongated, so that proper operation is obtained in spite of variations in the extent of movement of the release bars for the individual cells due to lost motion and temperature changes. The positioning and pulling of the master release bar to cover and uncover the key holes is opposed only by the friction of its supports; and when this master release bar is called upon to actuate parts for emergency release, it is pulled in one direction and transmits the actuating force under tension. Consequently, the master release bar may be relatively light and flexible, and is not subject to the usual limitations and disadvantages of long master bars for mechanical actuation of parts.

*Control cabinet.*—The hand levers for positioning the selector bars and release bars, together with the control switches and indicating lamps for the remote electrical control and indication of the door operating mechanisms, are preferably disposed in a suitable control cabinet located near one end of the cell block in position where the corridor and doors can be observed, and preferably in some appropriate protecting cage or enclosure. This control cabinet may take any suitable form; and the specific arrangement disclosed is merely illustrative.

Referring more particularly to Figs. 1, 15, 16, and 17, the control cabinet shown comprises two compartments or boxes formed of angle iron or equivalent supporting members and sheet metal walls welded or otherwise secured together in accordance with conventional practice, and in a manner not necessary to illustrate or describe in detail. One of these compartments, which is provided with a swing door 134 with a suitable lock (not shown), includes two levers KL and RL for operating the release bar 115 to its different positions. These levers are pivotally supported at their upper ends side by side on a pin 135 in brackets 136 attached to the top of the control cabinet; and the shorter lever KL is offset so that the intermediate portions of these levers are in the same vertical plane. The end of the release bar 115 for the end cell is fastened by rivets or the like to a pair of side plates 137 carrying two rollers 138 disposed as shown in position to be engaged by the levers. A latch member 140 is pivoted on a pin in a bracket 141 attached to a wall of the cabinet, and has a hook end which in the normal lowered position of this latch member engages a stop 142 on the shorter lever KL. A roller 143 fixed to the longer lever RL (shown dotted in Fig. 16) co-operates with a cam surface on this latch member 140 to lift it when the longer lever is pulled out.

Upon pulling the short lever KL, which may be identified by a suitable inscription on a plate attached thereto as shown the master release bar 115 is moved to its first operated position to uncover the key holes, the movement of the lever being limited by the engagement of the latch member 140 with the stop 142. Upon pulling the long lever RL, which may be identified by a plate bearing a suitable inscription as shown, the roller 143 lifts the latch member 140, so that the master release bar 115 may be moved to its extreme or second operated position to unlock and release all of the doors. The longer emergency release lever RL is preferably made of such length that the master release bar for a long cell block may be shifted through the limited distance of movement required to unlock and release the doors by one guard without undue exertion.

Since the compartment with the door 134 contains the emergency release lever RL by which all of the cells may be unlocked, it is evident that due precautions should be taken to prevent unauthorized access to this compartment. It is contemplated that the door 134 for this compartment will be provided with one or more special locks (not shown), and that the keys for such lock or locks will be retained in the warden's office or other safe location, where they can be obtained and used only by authorized persons.

The other compartment of the control cabinet, similarly provided with a swing door 145 and equipped with a suitable lock (not shown), contains the selector handle or lever for positioning the master selector bar 100 to hold or release the doors in their open position, and a control panel on which are mounted the indicating lamps, individual door control switches, and a master switch MS.

The selector bar 100 for the end cell is connected by a pin and slot connection 146 to an angle lever 147 pivotally supported on a bracket 148 fastened to the wall of the control cabinet, as shown in Figs. 15 and 16; and the other end of this angle lever 147 is pivotally connected to a vertically movable slide 150 having a suitable hand grip at its lower end. This manually operable selector slide 150 is guided in a slot in a cross member 151 and is formed with notches 152 to engage the edges of this slot to hold the slide in its different positions, a leaf spring 153 being preferably provided to facilitate its manipulation. By moving this selector slide 150 up and down, the guard may position the master selector bar 100 so as to release all of the doors operated to the open position, in the manner previously explained.

The control panel 155, preferably of a suitable insulating material, is detachably fastened as by screws to the front of a box-like casing 156 into which the various connecting wires (not shown) are run through an enclosed wire duct 157 and through a suitable insulating bushing 158 through the wall of the control cabinet into the chaseway above the cells, and thence along this chaseway, loose or bound in cable form as preferred, to the terminals for the motors and contactors associated with the several doors. No attempt has been made to illustrate the arrangement and structural details of the wiring and terminal connections, which may take any suitable form in accordance with approved practice for electrical installations of this character.

Mounted on the control panel 155 are a number of indicating lamps 160, one for each cell, which are arranged in rows and are adapted to be lighted when the corresponding cell door is fully closed and locked. One typical structure of an indicating lamp suitable for this purpose is illustrated in Fig. 19, and comprises a socket 161 extending through a hole in the panel 155 with a flange on the front end and a threaded sleeve or nut for clamping the socket to the panel. The socket includes spring contact fingers 162, with suitable terminals not shown, supported on a block of insulating material attached to the socket, said contact fingers being adapted to receive and support a miniature electric lamp 163 of the telephone type. A cap 164, including a glass bull's eye has a split spring flange fitting tightly in the front end of the socket, so that this cap may be removed when necessary to replace the lamp. Each indicating lamp is identified with its cell door in a suitable manner, preferably by a number appearing on the bull's eye.

The control panel 155 also has mounted thereon, adjacent each indicating lamp, an individual door control switch 165 of the three-position snap type adapted to close contacts in the neutral or middle position and also in each of two extreme operated positions.

The master switch MS on the control panel in the form shown comprises a lever 167 with a suitable knob which may be rocked or tilted from "closed" position to "open" position. This master switch MS, as shown in Figs. 20 and 21, preferably comprises a rocking frame 168 which is secured to the shaft 169 operated by the lever 167, and is pivotally supported in a bracket 170 fastened to the panel 155. This frame 168 carries a plate 171 of insulating material on which are supported in spring clips mercury contactors 172 of the same type employed for the limit switches previously described, there being two of these mercury contactors 172 for each door, one acting to close a control circuit for door closing when the plate is tilted to one position, and the other closing a control circuit for door opening when said plate is tilted to the other position. A latch or detent device is preferably employed for holding the master switch MS in its operated position; and as shown, this detent comprises a leaf spring 174 with a rounded end engaging in notches in a lug 175 attached to the frame 168 supporting the plate 171.

It is contemplated that the swing door 145 giving access to the control panel 155 will be kept closed and locked except when doors are not being manually controlled, and a cut-out switch is preferably employed to cut off the supply of current to the indicating lamps and control switches when this door is closed. This cut-out switch not only extinguishes the lamps when not in use, thereby prolonging their life, but also cuts off all electrical energy from the door control switches and wires, and obviates the possibility of false operation by crosses or grounds developing in the electrical control circuits.

One simple form of such a cut-out switch has been shown in Fig. 17 to illustrate the intended function and operation; but any other type of construction may be employed for this purpose. The cut-out switch 178 illustrated comprises a plunger 179 supported and guided in a suitable casing and urged outward by a spring 180. This plunger 179 carries a sleeve of insulating material with a metal band 181 secured thereto and adapted to engage spring contact fingers 182 when the door 145 is open and this plunger is moved to its outer position by the spring, said contact fingers being suitably supported on insulating blocks and terminal posts in accordance with conventional practice.

It can be readily seen that when the door 145 giving access to the control panel is unlocked, the spring 180 will push out the plunger 179 and bring the metal band 181 into engagement with the contact fingers 182 and supply current to the control and indicating circuits. When the door is closed and locked, however, the parts are in the position shown in Fig. 17, and current is cut off from the control and indication circuits. This cut-out switch 178 may be provided with a plurality of contacts for the control of the alarms or lamps in the warden's office or other locations, in a manner not specifically illustrated, so as to show when the door for a control panel is not properly closed and locked.

*Control and indication circuits.*—The preferred arrangement of control and indication circuits is illustrated diagrammatically in Fig. 22 for two doors, this same arrangement being duplicated for as many doors as may be included in the cell block or the group under supervisory manual control from the same control point. The contacts of the individual door control switches and the master switch are shown diagrammatically and conventionally in this circuit diagram of Fig. 22 as comprising contact arms engaging stationary contacts. A suitable source of alternating current for operating the motors and lighting the indicating lamps has been illustrated conventionally as a transformer T with the cut-out switch 178 in its primary circuit.

Considering the control circuits, which are the same for all doors, and have been assigned the same reference numbers with exponents, a closing control wire 185 and an opening control wire 186 extends from the control panel to the motor M for each door with a common return wire C for all of the motors. These control wires include the limit switches SC and SO and are connected to separate contacts of the corresponding three-position individual control switch.

Each door operating motor in the specific embodiment illustrated is of the alternating current type, preferably a split phase induction motor having two field windings 1F and 2F, and a squirrel-cage type rotor. One terminal of each of the field windings is connected to the common return wire C, and the other terminals are connected across a condenser 187 of suitable capacity and to the opening and closing control wires. It can be seen that if alternating current is supplied across one control wire 185 and the common return wire C, one of the field windings 1F is energized directly and the other field winding 2F is energized in series with the condenser 187, thereby producing the necessary phase displacement of the current in the two field windings and causing the rotor to turn in one direction; whereas, if the other control wire 186 is energized, the field winding 2F is directly energized, and the other field winding 1F is connected in series with the condenser, so that the direction of rotation of the rotor is reversed.

In this connection, it is preferred to employ a motor of the type having a suitable field structure and rotor conductors of sufficient resistance designed so that the current when the motor is stalled is not much higher, say 10 per cent, than the normal operating current, and the starting torque is substantially the same as the running torque.

As shown in Fig. 22, the individual door control switches 165 are assumed to be in the neutral or middle position, the master switch MS in the closed position, and the doors closed and locked, with the limit switches SC for the closed position open, and the limit switches SO for the open position closed. With the individual control switches 165 in the middle positions, the control wires 185 and 186 are connected to separate contacts on the master switch.

Assuming that the master switch is moved to the open position, the opening control wires 185 for all of the doors are energized in multiple to supply operating current to the motors M to open the doors. This operating circuit in the case of the door operated by the motor M, which is typical of all of the others, may be readily traced from one terminal of the secondary of the transformer T, contact member 190 of the master switch in its dotted position, contact 191 of the individual door control switch 165, opening control wire 186, limit switch SO, field windings IF, 2F, and condenser 187, to the common return wire C, and back to the other terminal of the transformer secondary.

When the door moves from its closed position, the bar 85 is disengaged from the roller 84, and the limit switch SC drops to close the break in the closing control circuit, so that the door may be reversed in an intermediate position if necessary. When the door reaches its open position, the actuating bar 90 engages the roller 89, and the limit switch SO is operated to open the motor circuit. The circuit for closing the door is similar to the one traced, and need not be specifically described.

The opening and closing control wires 185 and 186 for the motor M of any selected door may also be energized at any time, independently of the position of the master switch MS, by the manual actuation of the corresponding individual control switch 165 to move its contact members 191 and 192 up or down, as the case may be, to connect one or the other of these control wires to the terminal of the transformer secondary, both control wires being disconnected from the master switch under such conditions. For example, with the master switch MS in the closed position and all of the doors closed and locked as shown in Fig. 21, if the individual control switch 165 is operated to move its contact member 191 down, current is supplied to the control wire 186 to open the corresponding door, without affecting any of the other doors. Similarly, if the door is standing open, any individual door may be closed by operating its individual control switch.

In other words, the movement of an individual door control switch 165 from its middle position disconnects the control circuits for that door from the master switch MS, and energizes either the opening or the closing control wire 185 or 186, dependent upon the position to which this individual switch is operated; and consequently any individual door may be opened or closed at any time for any purpose, independently of the existing position of the master switch, and without affecting the existing position of any of the other doors. In this connection, it can be seen that when an individual control switch 165 is moved from one extreme position to the other, it passes through the neutral position, and the control wire corresponding to the existing position of the master switch may be momentarily energized; but this merely gives a preliminary energization of the motor to operate the door to the same position for which the individual switch is being operated.

Considering now the means for indicating at the control point the closed position and locked condition of the various doors, in the circuit arrangement of Fig. 22 the indication contactors 91 for the doors are merely connected in series with their corresponding indicating lamps 163 and a source of current, illustrated as being another secondary of the transformer T to provide a voltage suitable for the lamps. It can be readily seen that, when a door is closed and locked, its indicating lamp is lighted, but whenever the door is open or is not locked, this lamp is extinguished. If a lamp should burn out, or its circuit become broken for some reason, there is no indication; and consequently, the lighting of a lamp is definite assurance that the system is in proper condition and the door is actually closed and locked.

The cut-out switch 178 previously described is illustrated in Fig. 22 as opening the primary circuit of the transformer T, but may be arranged in any other suitable way to cut off the supply of current to the indicating lamps and switches of the control panel whenever its door 145 is closed and locked.

*Operation of the door operating mechanism.*—With this explanation of the electric control and indication circuits, consideration may be now given to the mechanical operation and movement of the parts in the power operation of opening and closing the doors. In Figs. 1, 2, and 3 and associated sectional views the parts are illustrated in the positions for the door fully closed and locked.

Assume now that the master switch MS, or the individual control switch 165 is operated to supply current to the motor M for the purpose of unlocking and opening the door. The pinion 24, rotated by the motor M through the non-reversible worm 29 and gear 28 (see Fig. 3), drives the rack 23 and the operating slide O connected therewith in the opening direction, that is, toward the right as viewed in Fig. 1. By non-reversible is meant that the worm is of such pitch that even when well lubricated the worm wheel 28 cannot drive worm 29 although the worm 29 can drive the worm wheel 28. Referring to Fig. 9, during the first part of this movement of the operating slide O, the coupling bolt 35 moves freely in the recess 36 in the door slide D until the block 63 on the operating slide O clears the cam surface 62 on the lower edge of the lift bar 39, whereupon the lift bar falls by its own weight and allows the end of the coupling bolt 35 to enter the hole 37 in the door slide D. In other words, at the beginning of the opening operation, the operating slide O moves for a limited distance of lost motion independently of the door slide D, and then the operating slide and the door slide are positively coupled for the opening movement.

During this idle or lost motion movement of the operating slide O, the right-hand beveled edge or cam face on the cam member 78 attached to the operating slide engages the roller 75 of the lock bolt actuator, as can best be seen by reference to Figs. 1 and 8, thereby lifting the lock bolt 65 and unlocking the door. The angle lever 73 turns freely on the shaft 50 during this operation. The roller 75 on the lock bolt actuator 70 is held in the raised position by the upper edge of the other cam member 77 in the door slide, until the door has moved to the point where the staple 68 is free of the lock bolt 65. At the time the coupling bolt 35 drops into the hole 37 and connects the operating slide O to the door slide D, any impact or jar is absorbed by the left-hand spring plunger 16. During the continued movement of the door toward the open position, the roller 38 on the coupling bolt 35 rides along the upper edge of the lift bar 39.

One important feature of the invention is that the lost motion between the operating slide O and the door slide D, which is necessary to raise the lock bolt during the initial opening operation, is eliminated when the door starts to move; and the door is directly connected to the operating slide during the opening movement. This avoids excessive shock or jars being transmitted to the operating mechanism if a prisoner should try to pull the door back and forth while it is moving, as would otherwise occur if the lost motion were present while the door is unlocked and being moved. It can be seen that the parts may be readily proportioned so that the coupling bolt 35 will drop into the hole 37 and positively connect the door slide D to the operating slide O at substantially the same time that the operating slide O and the cam member 78 thereon have moved far enough to unlock the door, so that all the lost motion is eliminated before the door is free to be pushed or pulled by hand.

As soon as the operating slide has moved a short distance from the fully closed and locked position of the door, the bar 85 carried thereby disengages from the roller 84 of the closing limit switch SC, and allows the member 79 carrying the mercury contactor 80 to drop by its own weight and close the break in the closing control circuit. This enables the operating mechanism to be reversed in mid-stroke to close the door from an intermediate position if occasion should require.

When the operating slide O reaches the door opened position, the bar 90 carried thereby strikes the roller 89 of the opening limit switch SO, tilting the plate and mercury contactor of this limit switch to break the opening control circuit; and by adjustment or proper proportioning of the parts, the motor current may be cut off at the appropriate point to avoid unnecessary shock or impact when the door is fully open against a stop usually provided. Such shock that may occur is absorbed in part by the spring bumper 16 between the plate 19 on the door and the door slide D, and also by the engagement of the spring plunger 32 on the operating slide O with the bracket 26 for the driving shaft. The spring bumper 32 on the operating slide O is provided to absorb the inertia of the operating mechanism when it is operated to the open position by the motor without being connected to the door, as may happen in case the door has been previously opened by hand by using the key device or emergency release in the manner previously explained.

As soon as the lock bolt 65 is raised, the parts of the indication contactor change from the position shown in Fig. 11 to the position shown in Fig. 13, thereby tilting the mercury tube 91 to a position to open the indicating circuit and extinguish the lamp. While the door is partially or fully open, with the lock bolt 65 dropped, the parts of the indication contactor are in the position shown in Fig. 12, with the indicating circuit still open.

Considering now the closing operation, when the motor M is energized to drive the pinion 24 in the other direction to close the door, the rack 23 is driven in the opposite direction, toward the left as shown in Fig. 1. As previously explained, the selector bar 100 may be positioned to leave the door coupled to the operating mechanism and thus held in the open position, or may be set to disconnect the door for hand closing; and in describing the movement of the parts, consideration should be given to these different conditions.

If the door has been left coupled to the operating slide O in the open position, the coupling bolt 35 is down in the hole 37 in the door slide D, and the operating slide and door slide start together in a closing movement. When the door reaches the proper point in its closing movement, the left-hand beveled edge of the cam member 77 on the door slide D engages the roller 75 on the lock bolt actuator 70 (see Fig. 8), thereby raising the lock bolt 65 clear of the staple 68 during the final closing movement. At the appropriate point in this movement, the limit switch SC is operated to cut off the current from the motor. Also, during this final closing movement of the door, the bar 63 on the operating slide O engages the cam surface 62 on the lower edge of the lift bar 39 (see Fig. 9), and raises the lift bar to lift the coupling bolt 35 out of the hole 37 in the door slide D. During this idle or lost motion movement of the operating slide relative to the door slide, the cam member 78 on the operating slide O moves under the roller 75 on the lock bolt actuator 70 into position ready to unlock the door during the next opening operation. When the parts are in the closed position shown in Fig. 8, the roller 75 on the lock bolt actuator 70 drops down back of the shoulder on the cam member 77 on the door slide D, thereby locking the door closed at this point as well as by dropping the lock bolt 65.

If it should happen that the door is released in its open position by positioning the selector bar 100 to raise the coupling bolt 35 as previously explained, the initial closing movement of the operating slide O pulls the cam block 111 thereon out from under the roller 110 (see Figs. 1 and 10), allowing the coupling bolt 35 to drop back into the recess 36 and engage the shoulder at the end thereof (see Fig. 9), whereupon the operating slide O and the door slide D move together in the same relative position as when the door is fully closed, the cam members 77 and 78 being substantially in alignment. The lock bolt actuator 70 is raised and dropped, and the limit switch SC is likewise operated in the same manner described, and as if the door had been left coupled to the operating mechanism. In this case, however, there is lost motion in one direction between the door slide and the operating slide; but if any attempt is made by a prisoner to pull the door back and forth while it is closing, the first movement to take up the lost motion allows the coupling bolt 35 to drop into the hole 37, and thereby provide a positive connection between the door slide and the operating slide.

In connection with this power operation of the doors, it is proposed to use such a gear reduction between the motor and the operating slide as will cause the door to be moved relatively slowly, requiring for example 4 to 6 seconds for an opening or closing movement. This reduces the shock and jar at the end of the door movement that would otherwise occur if a door as heavy as the usual cell door were moved more quickly. Also, the driving torque of the motor is preferably such that the force exerted upon the door, even with the motor stalled, such as for example, a force in the order of 30 lbs., will be ample to overcome the relatively small frictional opposition to door movement, but not so great as to seriously injure a prisoner that may be caught in the door. With such a slow rate of movement and a limited driving force, a prisoner may hold the door against movement; but as previously noted, a motor is selected with such characteristics that the stall current is not much in excess of the motor load current, so that such obstruction of the door will not injure the motor.

As previously explained, the master selector bar 100 may be set so that all open doors are free to be closed by hand. Also, any open door may be released and its operating mechanism by using the key device 125 of Fig. 18, assuming that the master release bar 115 has been positioned to uncover the holes for this key device. The turning of the shaft 50 by the key device causes the lift bar 39 to be raised with a substantially parallel motion and disengage the coupling bolt 35 with the door in its open position in the same way as in the closed position. After the door has been released from the operating mechanism and manually closed in either case, the front or left-hand edge of the cam member 77 on the door slide D (see Fig. 8) engages the roller 75 on the lock bolt actuator, the same as when the door is closed by power; and the door is thus automatically locked when closed by hand.

When the door has been closed by hand and the operating slide O is subsequently moved by power to the closed position, the coupling bolt 35, which under these conditions is resting on the upper surface of the door slide D, may drop into the hole 37 in the reinforcing block 41 on this door slide D (see Fig. 9) when the operating slide O is nearly in its closed position; and the beveled end of the block 63 secured to the operating slide O (see Fig. 9) engages the cam surface 62 on the lift bar 39 to raise this lift bar and the coupling bolt 35 carried thereby so as to allow this coupling bolt 35 to assume its normal position shown in Fig. 9, with the lost motion between it and the door slide D. Also, the left-hand beveled edge of the cam member 78 attached to the operating slide O (best shown in Fig. 1) allows this cam member 78 to raise and pass under the roller 75 of the lock bolt actuator 70 as the operating slide O completes its final closing movement, thereby bringing this cam member 78 into position ready to unlock the door during the next initial opening movement of the operating slide O. In this way, when the operating slide O is moved to the closed position after the door has been closed by hand, the operating slide is automatically coupled to the door slide ready for any subsequent unlocking and opening of the door by power; and the same automatic coupling will occur if the operating slide is moved to its closed position with the door only partially closed. Also, in case the door is unlocked and opened manually by the use of the key device, leaving the operating slide in its closed position, either a subsequent manual closing of the door, or a subsequent movement of the operating slide O, together with the coupling bolt 35 carried thereby, to the open position, results in an operation of the coupling bolt 35 to connect the operating mechanism to the door for subsequent power operation. In this case, the coupling bolt 35 is not held up by the door slide D, this door slide being in the open position while the operating slide O is in the closed position. When the operating slide O and the door slide D are brought into corresponding positions, the inclined or beveled face 41a on the reinforcing block 41 on the door slide D (see Fig. 9) engages the lower end of the coupling bolt 35 and raises this bolt so that it may drop into the recess 36 or the hole 37, as the case may be, depending upon whether the operating slide O is in the closed or open position at the time. In other words, whenever the door has been moved by hand to a position out of correspondence with the position of the operating mechanism, a subsequent operation of the door or the operating mechanism into corresponding positions automatically couples up the door with said mechanism ready for power opening or closing.

From this explanation of the operation and the organization of control circuits and switches, it can be seen that this invention provides a facility and flexibility for the operation of prison cell doors by hand, or by power under supervisory manual control, in a way to take care of all of the usual conditions in prison operation. All of the cell doors in a cell block, or any selected group, may be placed under the control of the master switch MS by positioning the corresponding individual door control switches 165 in the middle position; and by manual movement of the master switch the guard is able to unlock and open all of these doors at the same time to release the prisoners for work, recreation, or for any other reason. If it should happen that all of the cells of a cell block are not occupied, or that a certain prisoner or prisoners are to be kept confined while the others are released, the door operating mechanism for these cells may be disconnected from the master switch by movement of their individual control switch 165 from the middle position, so that these doors will be left closed and locked when the other doors are unlocked and opened at the same time by operation of the master switch. The handles for the individual door control switches 165 are preferably arranged in rows on the control panel directly below the numbers identifying the various cells, as indicated in Fig. 15; and consequently, the guard can easily tell by the position of these handles which doors are under the control of the master switch.

Similarly, when the prisoners are marched into the cell corridor to be confined, all of the cell doors, or any selected group of those open, can be closed and locked at the same time by operation of the master switch; but if desired and if occasion should require, the guard may close and lock by power the open doors one at a time and in any order by the manipulation of their associated individual door control switches.

Further, if it is desired to release or lock up any individual prisoner, the door for his cell may be opened or closed by power independently of all of the other doors by the appropriate manipulation of the corresponding individual control switch. After any individual door has thus been operated to either the closed or open position, and its individual control switch is restored to the middle position, the motor for this door is connected to the master switch, and the door is operated by power to either the open or closed position, as the case may be, to conform with the existing position of the master switch.

Various other examples of the individual or group operation of prison cell doors by power might be given; but it is believed that the facility of the supervisory manual control of the doors afforded by this invention can be readily appreciated without further discussion.

In addition to the power opening and closing of the door, any door may be opened or closed manually by the guard by using the key device 125 of Fig. 18, providing the master release bar 115 has been positioned in the control cabinet to permit the use of the key device. Consequently, individual prisoners may be locked up or released in this way, if the guard desires; and also such manual operation of a particular door may be employed if its operating mechanism or control circuits should be out of order. Whenever any door has been hand-operated in this way, it may be subsequently opened or closed by power, either by its individual control switch or by the master switch, after the appropriate manipulation of its control switches to couple up the door to its operating mechanism. Under such circumstances, the condition of the indicating lamp as compared with the position of its control switch, will show when the door and its operating mechanism are in corresponding positions.

Instead of closing the doors by power when the prisoners are to be locked up, the guard may position the selector bar 100 in the manner previously explained, either at the time the doors are first opened or later when the prisoners are marched into the cell corridor, so that the open doors may be closed by the prisoners as they enter their cells, following the prison routine now frequently adopted. The indicating lamps 163 show when the respective doors have been closed and locked; and after all of the doors are closed, the guard may throw the master switch and cause the operating mechanisms to move to their door closed position, so that the doors closed by hand are coupled to their operating mechanisms ready to be unlocked and opened by power, and are also held locked by the engagement of the roller 75 on the lock bolt actuator with the square shoulder on the cam member 77 on the door slide, as shown in Fig. 8, as well as by non-reversible gearing connection to the operating slide, in addition to the regular lock bolt.

Further, as already explained, all of the doors may be unlocked and coupled from their mechanisms by operation of the master release bar 115 in case of a power failure or other emergency condition.

*Centralized power control and indication.*—One important attribute of this invention is that the doors are normally power operated individually or in groups by electrical control, and are also indicated electrically. This makes it possible to provide additional centralized control and indication in the warden's office or like central point as a further safeguard in prison operation. For example, suitable provision may be made to control from the warden's office the supply of current to the various cell blocks, so that the control panels cannot be used to unlock and open the doors improperly. Various other adaptations of the electrical system may be employed to provide any desired safety feature. Fig. 23 shows diagrammatically one typical or representative arrangement for the control or indication in the warden's office.

Referring to the diagrammatic illustration of Fig. 23, the parts included within the dash rectangle 195 are assumed to be located in the warden's office, or similar central location. The control panels for two cell blocks are indicated at 196 and 196'; and circuit controllers, one for each door and closed only when that door is closed and locked, are indicated at 197, 197'. These circuit controllers 197 are preferably of the same inclosed mercury contact type used for the limit switches and indication contactor, and are secured to the same plate 93 as the mercury tube 91 of the indication contactor (see Fig. 11).

These circuit controllers 197 for all of the doors of a cell block are connected in series in an energizing circuit for a relay 198 of the ordinary type, supplied with current from a suitable source, which is illustrated as a storage battery 199 maintained charged by the usual double-wave rectifier 200 from the secondary of the transformer 201 connected to the power mains 202. The battery 199 is used to provide a reliable reserve source of current if the main alternating current supply should fail.

Each of these relays 198 has associated therewith an indicating lamp 203, which is lighted when the corresponding relay is energized to close its front contact 204, by current from the battery 199. Each of these relays 198, when de-energized to close a back contact 205, is arranged to supply current to a bell 206 or corresponding alarm device. As illustrated, a switch 207 is provided for each relay 198 to open its alarm circuit; and similar master switches 208 and 209 may be provided to open the indicating and alarm circuits for all the cell blocks.

This arrangement provides a reliable indication in the warden's office of the locked condition of the doors in the various cell blocks, the lamp 203 for each cell block being lighted only if all of the doors of that block are closed and locked. Consequently, the warden or other person in charge can readily tell from these indicating lamps 203 when the doors of a given cell block, or the doors through the prison, are properly closed and locked. Also, if any door is opened at a time when the doors are intended to be closed, this condition is indicated in the warden's office by the de-energization of the relay 198 for the corresponding cell block, and the extinguishing of its lamp 203. At night, or at other times when occasion may require, the switch 209 may be closed; and the opening of any door in the prison will sound the alarm 206. The switch 208 may be used to cut out the indicating lamps 203 and prolong their life, when they are not needed.

Fig. 23 also illustrates how the supply of power to the control panels for the various cell blocks may be controlled from the warden's office, or similar central point, in such a way that the warden or other authorized person has a general supervision over the power operation of the doors throughout the prison. As shown, a master power switch 210, such as the conventional knife-switch or other suitable type, may be used to connect or disconnect the power mains 202 from power buses 211; and similar switches 212, one for each individual cell block, may be used to control the supply of current from these buses 211 to the control panel 196 for the corresponding cell block. With this arrangement, in case of any disorder in a cell block, the switch 212 for that cell block may be opened to cut off all supply of door-operating current and prevent any improper unlocking and opening of the doors by power, even if a prisoner should overpower the guard and get access to the control panel. At night, or at other times when all of the prisoners are to be kept locked up, the main power switch 210 may be opened; and then no cell door in the cell block in the prison can be unlocked or opened by power. Also, if desired, telephone communication may be provided between the warden's office and each control cabinet in an obvious manner; and the switches 212 for the cell blocks may be kept open ordinarily and closed only when a guard telephones that he wishes to operate the doors by power. In this way, the power operation of the doors to release prisoners may be regulated from the warden's office or like central control point, in a manner to increase the safety of prison operation.

The foregoing description, in connection with the accompanying drawings, relates to certain specific constructions and arrangements of parts and circuits which are merely illustrative of the nature of the invention and the intended mode of operation; and I desire to have it understood that various modifications and adaptations may be made in this disclosure without departing from the essential features and attributes of the invention.

What I claim is:

1. In a system for operating prison cell doors individually or simultaneously in a selected group comprising, a unitary power mechanism for each door including an electric motor and means driven thereby for operating the door lock and moving the door, a master switch manually operable to either of two positions only for energizing the motors connected thereto to cause simultaneous unlocking and opening or closing and locking of the corresponding doors, and a three-position individual control switch for each door operable in one position to connect the motor of that door to said master switch for control thereby and in its other two positions to control the energization of the individual motor of the corresponding door to unlock and open or close and lock the door respectively and independently of said master switch, said master switch and individual control switches remaining in the last operated position until changed.

2. In a system for operating and locking prison cell doors, a unitary power mechanism for each door including an operating slide for actuating the door lock bolt and moving the door to its open and closed positions, said mechanism having a reversible electric motor and non-reversible gearing for reciprocating said operating slide, separate opening and closing control circuits for each motor, manual control means including a single master switch and a plurality of control switches one for each of the individual doors for governing the energization of said control circuits of the motors of said power mechanisms from the same remote control point, either individually by their respective control switches independently of the control position of the master switch or simultaneously by the master switch in a group as selected by the position of the individual control switches, all of said switches remaining in the last operated position until changed, a master release bar extending to all of said mechanisms and manually movable from said control point for mechanically and simultaneously releasing the locks of all of the doors and also disengaging the doors from their respective operating slides, whereby the doors may all be freed for hand operation in the case of power failure or other emergency.

3. A unitary power device for locking and operating prison cell doors comprising, a mechanism mounted in an enclosed chamber above the door and including an electric motor and gearing for automatically operating the locking device of the door to unlock the door and move the door to its open position or move the door to its closed position and lock the door, release means within said chamber adapted to be actuated by a hand key device for releasing the door lock independently of the operation of said mechanism, the front wall of said chamber having a small opening therein giving access to said release means only for operation by said hand key device, and means including a slide bar operable manually from a remote point for covering and uncovering said opening in the different positions of said slide bar.

4. In a system for operating slide prison cell doors, a unitary power mechanism for each door mounted in an enclosed chamber above the door and comprising, an operating slide mounted for sliding movement substantially parallel with the movement of the door to operate the door, an electric motor and non-reversible gearing driven thereby for reciprocating said slide, individual control means for each motor to apply current thereto to operate the same in either of two directions, a lock bolt for the door automatically operated by said operating slide to lock the door in its closed position, disengageable coupling means for operatively connecting said operating slide to the door, release means disposed within said chamber to operate said lock bolt to its unlocked position and also to disengage said coupling means to free the door from said operating slide for hand operation, a portable hand key device, said release means including a shaft extending transversely of the direction of movement of the door and adapted to be engaged and turned by said hand key device and a master slide bar extending to all of the cells and operable manually from a remote control point, said master slide bar acting in its different positions to prevent or permit operation of the release means of any one of the doors by said hand key device, whereby individual doors may be unlocked and released from their operating mechanisms for hand operation by a key device provided said master bar has been operated.

5. A unitary power mechanism for operating and locking sliding prison cell doors comprising, a motor driven openating slide mounted above the door for sliding movement substantially parallel with the movement of the door, coupling means for connecting said operating slide to the door with a limited amount of lost motion of the slide relative to the door in its closed position, means controllable from a remote point for operating said coupling means to disengage the door from said operating slide for hand operation, a vertically movable lock bolt co-operating with a hole in a staple fixed to the door, a lock bolt actuator having a roller, a cam member movable with the door and engaging said roller for lifting and dropping said lock bolt during the final closing movement of the door, and a separate cam member movable with the operating slide for engaging said roller to lift the lock bolt to unlock the door during said lost motion movement of the slide relative to the door, whereby the door is automatically locked when closed by hand as well as automatically locked and unlocked when closed and opened by said operating slide.

6. In a locking and operating mechanism for prison cell doors, an operating slide mounted above the door for sliding movement substantially parallel with the movement of the door, means operatively connecting said operating slide with the door to provide a limited amount of lost motion of said slide relative to the door in its closed position, an electric motor and gearing for moving said operating slide in opposite directions to open and close the door, a lock bolt for the door, a lock bolt actuator having a roller thereon and operable to move said lock bolt into and out of its locking position, and separate cam members attached to said operating slide and to the door respectively for co-operating with said roller, said cam member attached to the door having a cam surface engaging said roller to operate said lock bolt actuator successively to its unlocking and locking positions during the final closing movement of the door, said cam member attached to the door also having a shoulder engageable with said roller in the locked position of said lock bolt actuator to hold the door in its closed position independently of the lock bolt, said cam member attached to the operating slide having a cam surface engaging said roller to operate the lock bolt actuator to its unlocking position during the lost motion movement of said slide with the door in its closed position.

7. In a system for the joint operation of prison cell doors and their locks by power and manually, an operating mechanism for each door having its elements mounted on a main supporting member and comprising, an operating slide and a door slide supported for joint and independent sliding movement, an electric motor and non-reversible gearing for reciprocating said operating slide, coupling means disengageable in any position of said slides for operatively connecting them with a relative lost motion in the closed position of the door only, a lock bolt for the door, separate cam members attached to the respective slides for operating said lock bolt to and holding it in an unlocked position during a predetermined portion of the movement of said door near its closed position, a selector bar manually operable from a remote point and effective only for each door having its operating slide in its door opened position for disengaging said coupling means to free the door slide and permit closing of the door by hand, a release means associated with each door for concurrently disengaging its coupling means and operating its lock bolt to the unlocked position, said release means being adapted to be manually operated from a point adjacent the door by a key device, and a master release bar movable from said remote point and operable when moved from its normal position to one operated position to render said release means of the several doors accessible for operation by the key device and when moved to another operated position to operate said release means for all of the doors simultaneously.

8. In a system for operating prison cell doors having lock bolts, a unitary power mechanism associated with each door for operating said lock bolt and moving the door to the open or closed position, said mechanism including an electric motor and non-reversible gearing, manually operable circuit controlling means at a remote control point for governing the operation of said electric motors of said mechanisms individually or simultaneously in selected groups, a release device associated with each door and operable to unlock the door and disconnect it from its operating mechanism, said release device being adapted to be manually actuated from a point adjacent the door by a key device, a master release bar extending to all of the doors and effective when moved from a normal position to one operated position to render said release devices for the several doors operable by said key device and when moved from said one operated position further in the same direction to another operated position to actuate said release devices for all of the doors to free them for hand operation, and manually operable means at said remote control point for shifting said master release bar to its different operated positions.

9. In a system for operating prison cell doors having lock bolts, a unitary power mechanism associated with each door and controllable electrically from a remote control point to operate the lock bolt of the door and move it to the open or closed position, said power mechanism including an operating slide, an electric motor and non-reversible gearing for reciprocating said slide, disengageable coupling means for operatively connecting the door with said operating slide for both opening and closing movement of the door, release means associated with each door for disengaging said coupling means to free the door for hand operation, said coupling means being disengaged by said release means in any position of the door and being automatically re-engaged whenever said release means is restored to its normal inactive position and thereafter the door and operating slide assume a predetermined relative position by movement of either, said release means including a slide bar and a cam member thereon, said slide bars for the several doors being connected together to constitute a master bar extending from the remote control point to all of the doors, said cam member on each slide bar being shaped to cause a predetermined movement of the associated coupling means for any movement of the slide bar in excess of a predetermined minimum, whereby all of said release means for the several doors may be effectively operated by sufficient movement of the end of the master bar at the control point notwithstanding variations in the extent of movement of the slide bars for the individual doors.

10. In a system for operating the doors of a prison cell block, a unitary power mechanism for each door including an electric motor for automatically operating the door lock and for opening and closing the door, said mechanism including non-reversible gearing to hold the door in its different positions, manual control means at a remote control point operable to energize the motors of said mechanisms individually or in selected groups, and selector means manually operable from said remote control point and a cooperating device associated with said mechanism for rendering each of said mechanisms that have been operated to move a door to the fully open position effective or non-effective at the will of the operator to hold that door open and without releasing the other doors from their operating mechanisms, whereby the doors may be controlled from said control point so that each door that is fully opened may be held by its power mechanism in the open position or may be freed from the power mechanism only if fully open to allow closing by hand.

11. A power mechanism for operating the lock bolt and moving prison cell doors comprising, a door slide moving with the door, a motor driven operating slide, means responsive to the movement of said operating slide to a limited extent near the closed position of the door for operating said lock bolt, a movable coupling member positively driven by said operating slide and acting in one position to connect with the door slide directly and in another position to drive the door slide with a limited amount of lost motion, cam means on said operating slide effective during part of the movement of said operating slide near the closed position of the door for automatically moving said coupling member to said another operated position, whereby the door is positively connected to the operating slide during the opening and closing movements of the door and yet a limited amount of lost motion of the operating slide relative to the door near its closed position is provided for operating the lock bolt, and manually controllable means for at times actuating said coupling member to free said door slide entirely from said operating slide.

12. A unitary power mechanism for locking and operating sliding prison cell doors comprising an operating slide mounted above the door for sliding movement substantially parallel with the movement of the door, an electric motor and non-reversible gearing for reciprocating said operating slide, coupling means including a movable element carried and positively driven by said operating slide for connecting said operating slide to the door for movement in both directions, said movable element in one operated position providing a limited amount of lost motion between said movable element and the door, a lock bolt for the door, a cam member associated with said operating slide for raising and lowering said lock bolt in the closed position of the door, means carried by and responsive to the movement of said operating slide near its door closed position for automatically moving said movable element of the coupling means to its said one operated position, whereby the operating slide is positively connected to the door during the opening and closing movements thereof but may move relative to the door near its closed position for the purpose of operating the lock bolt, and manually operable means for at times actuating said movable element to another operated position to free the door slide entirely from the operating slide.

13. A unitary power mechanism for operating the lock bolt and moving a prison cell door comprising, an operating slide and a door slide mounted for joint and independent sliding movement substantially parallel with the movement of the door, an electric motor and non-reversible gearing for moving said operating slide in opposite directions to open and close the door, means responsive to the closing movement of said operating slide near the closed position of the door for raising and lowering the lock bolt to lock the door, said means also being responsive to the initial opening movement of said operating slide to raise said lock bolt to unlock the door, a movable coupling member carried and positively driven by the operating slide for at times establishing a driving connection between said operating slide and the door slide, said coupling member in one position being positively coupled with the door slide and in a second position being coupled with the door slide with a limited amount of lost motion, said coupling member being operable to a third position to disconnect the door slide entirely from the operating slide, a lift bar for moving said coupling member to its different positions, means carried by the operating slide and effective near its closed position for automatically actuating said lift bar to move said coupling member to its second position, and manually operable means controllable from a remote point for actuating said lift bar to move said coupling member to its third position and also move said lock bolt to its unlocked position so as to free the door for hand operation.

14. A system for operating prison cell doors comprising, an individual power operating mechanism for each door operable to actuate the lock bolt and move the door to the open or closed position, said operating mechanism including an electric motor and non-reversible gearing, means including a disengageable coupling device for operatively connecting said door to said motor, manually operable circuit controlling means at a remote control point for governing the operation of said motors either for any individual door alone or for a selected group of doors, and a master selector bar extending to all of the doors from said control point and movable to a releasing position, means cooperating with said selector bar in its releasing position and effective with respect to each door only if its operating mechanism is in the door open position for disengaging said coupling device to free the door for hand closing, whereby a guard at the control point may at will determine if the open door or doors shall be held open by their operating mechanism or shall be free to be closed by hand.

15. A unitary power mechanism for interchangeable use with various prison cell doors for operating the locking device and moving a prison cell door to the open or closed position comprising, a main supporting member adapted to be secured to the vertical wall of the casing above the door, an operating slide and a door slide mounted on said supporting member for joint and independent sliding movement substantially parallel with the movement of the door, an electric motor and gearing on said supporting member for reciprocating said operating slide, disengageable coupling means for operatively connecting said slides, a track, rollers carried by door hangers attached to the door for supporting said door for sliding movement on the track, and means for operatively connecting the door to said door slide comprising a plate secured to the door hangers and spaced stops on said door slide engaging opposite edges of said plate, whereby the same mechanism may be used for doors having a different space relation to the vertical wall of the casing by varying the dimensions or shape of said plate.

16. In a system for the power operation of prison cell doors from a remote control point and the indication at said control point of the closed and locked condition of each door individually, the combination with a vertically movable lock bolt for each door and a cam member moved by the door, of an enclosed mercury contactor mounted on a tiltable member and adapted to open an indicating circuit when said member is tilted from a predetermined position, the ends of said member being positioned by the movement of the lock bolt and by said cam member on the door respectively so as to assume said predetermined position to close the indicating circuit only if the door is closed and also locked, and indication means at the control point for each door controlled by the corresponding indicating circuits.

17. In a system for operating prison cell doors, a unitary power mechanism including a reversible electric motor for operating the lock and moving each door to its open or closed position, an opening control wire and a closing control wire for each motor, a master switch operable to and remaining in either a door opening or a door closing position and having pairs of contacts for each door, a three-position individual control switch for each door remaining in each position until changed and effective in a middle position to connect said control wires for that door to the corresponding contacts of said master switch, said individual control switch in its extreme positions disconnecting both of its associated control wires from the contacts of the master switch and connecting one or the other of these control wires to a source of current in accordance with the extreme position to which said individual control switch is operated, whereby manual operation of the master switch causes opening or closing of all of the doors having their individual control switches in the middle position, and manual operation of any individual control switch to one extreme position or the other causes opening or closing of the corresponding door independently of the master switch and the positions of other doors, each door thus operated by its individual control switch remaining in its operated position so long as its individual control switch remains in an extreme position and being automatically operated to the open or closed position to correspond with the position of the master switch when its individual control switch is moved to the middle position.

18. In a system for the electrical control and indication of power operated prison cell doors, a unitary power mechanism for each door including a reversible electric motor and associated means for operating the lock bolt and moving the door to its open or closed position, separate opening and closing control circuits for each motor, an indication contactor for each door closed only when that door is closed and also locked by the lock bolt, a control panel at a remote control point having thereon indicating lamps arranged in rows and included in lighting circuits closed by the indication contactors of the corresponding doors, an individual control switch for each door mounted on said control panel adjacent the corresponding indicating lamp and operable from a middle position to either of two extreme positions to energize respectively the opening and closing control circuits for the motor of the corresponding door for opening or closing movement, a master switch mounted on the control panel and having a door opening and a door closing position only, means connecting the control circuits for the motor of each door with said master switch only if the individual control switch for that door is in its middle position, said master switch and each individual control switch having a projecting handle remaining in the last operated position until changed, said handles indicating by their relative positions when any given door has been controlled to operate to its closed position, thereby enabling the operator to determine when any given power mechanism has been controlled to close its associated door and the corresponding indicating lamp should be lighted under normal operating conditions.

19. A unitary power mechanism for operating the lock bolt and moving a prison cell door comprising, an electric motor and non-reversible gearing for reciprocating the door, a vertically movable lock bolt actuator connected to the lock bolt and having a roller, means associated with the power mechanism for co-operating with said roller to raise said lock bolt to its unlocked position during the initial opening movement of said mechanism, a cam member moving with the door and co-operating with said roller to raise said lock bolt during the final closing movement of the door, said cam member having a shoulder engaging said roller when the door is closed and said lock bolt actuator is in its locking position, thereby holding the door in its closed position independently of the lock bolt and the non-reversible driving connection between the door and the motor.

20. In a system for the remote control of power-operated prison cell doors, a unitary power mechanism for each door comprising, an operating slide mounted above the door for sliding movements substantially parallel with the movement of the door, an electric motor and non-reversible gearing controllable from a distant control point for driving said operating slide in opposite directions, a coupling device for operatively connecting said operating slide to the door, a lift bar effective when raised in any position of the door to operate said coupling device to disconnect the door from said operating slide, emergency release means manually operable from said distant control point for raising said lift bar with the door in any position, and means manually operable from said distant control point and effective only if said operating slide is in the position to fully open the door for also raising said lift bar, whereby doors that have been opened by the power mechanism may at the will of the operator be held open or released for hand closing and in the case of emergency all doors may be freed from their power mechanisms regardless of their positions.

21. In a system for the remote control of power-operated prison cell doors, a power mechanism for each door comprising a sliding operating member, an electric motor and non-reversible gearing for driving said operating member in opposite directions, disengageable coupling means for operatively connecting said operating member with the door, a lock bolt for the door, a lift bar effective when raised to operate said coupling means to disengage the operating member from the door in any of its positions and also to move said lock bolt to its unlocking position, manually operable means associated with each door and operable from a point adjacent the door by a key device to raise said lift bar with the door in any position, and means including a master slide bar operable from a distant control point and a coacting element on said operating member for raising said lift bar for only those doors then having their operating members in the door open position, whereby any selected door may be released from its operating mechainsm and also unlocked if closed for hand operation by the key device and all doors that have been opened by their power mechanisms may be governed from the remote control point so as to be held open by their mechanisms or released for hand operation at the will of the operator.

22. In a system for the remote control of power operated prison cell doors, a plurality of prison doors, a lock bolt for each door biased to its locked position, door operating means for each door, coupling means for each door biased to operatively connect the door to its operating means when such door and operating means is in registration, a reversible electric motor and non-reversible gearing for operating each said operating means and the door when coupled thereto to the open and closed position and allowing such door to be locked by said lock bolt when it reached the closed position, a first master manually operable means for operating both the lock bolt and the coupling means of all doors from their biased position effective for all positions of said operating means and doors, and a second master manually operable means for operating only said coupling means from their respective biased positions and then only for those doors which assume the open position.

23. An operating unit for controlling by power the operation and locking of a prison cell door comprising, a sliding cell door, a lock bolt biased to its locked position for holding said door locked when in its closed position, door operating means movable substantially parallel to said door, a reversible electric motor means for driving said operating means to a door-closed and door-open position without allowing the operating means to drive it, manually operable means for controlling said motor, a connecting means between said operating means and door affording lost motion, means for actuating said lock bolt against its bias during the opening movement of said operating means as afforded by said lost motion to unlock said door, and means including said connecting means for positively connecting said operating means to said door without lost motion effective at all positions of said operating means except when near its door-closed position, and manually operable selector means cooperating with means associated with said operating means for rendering said connecting means entirely ineffective only if said operating means is in the full door-open position, whereby a prisoner is unable to shake said door with respect to its operating means when the door is in an intermediate or open position and whereby said door may be closed by hand when said manually operable means is operated.

24. An operating unit for controlling by power the operation and locking of a prison door comprising, a door frame, means for allowing sliding movement of said door with respect to said frame, operating means movable substantially parallel to said door, a reversible electric motor, power transmitting means including worm gearing driven by said motor for operating said operating means, said worm gearing allowing said motor to operate said door but not allowing said door to operate said motor, whereby said door is held in its closed position by said operating means, a lock bolt guided in the door frame and engageable with a staple on the door to lock the door directly to the door frame, a lock bolt actuator guided above the door for end-wise movement vertically and operable to move said lock bolt into and out of engagement with said staple, means associated with said operating means for engaging and raising said lock bolt actuator to unlock the door during the initial opening movement of said operating means, cam means fixed to the door and engageable with said lock bolt actuator to operate the lock bolt, said cam means also cooperating with said lock bolt actuator in its lowered position to provide a supplemental lock for the door in addition to the lock bolt in engagement with the door staple, and manually operable release means for raising said lock bolt actuator and also disconnecting a door entirely from said operating means.

25. In a system for the joint operation of prison cell doors and their locks by power and manually; an operating mechanism for each door having its elements mounted on a main supporting member and comprising; an operating slide and a door slide supported for both joint and independent sliding movement; an electric motor and non-reversible gearing for reciprocating said operating slide; coupling means disengageable in any position of said slides for operatively connecting them with a relative lost motion in the closed position of the door only; a lock bolt for the door; separate cam members attached to the respective slides for operating said lock bolt to and holding it in an unlocked position during a predetermined portion of the movement of said respective slides near their closed position; means for controlling said electric motors from a point remote from all of said doors; and manually operable master release means, including a bar extending to a plurality of said doors and accessible for operation at a point remote from all of said doors, for when operated to one position opening a key hole cover for each door, and in another position disconnecting all door slides from their respective operating slides by disengaging their respective coupling means.

26. In a system for the joint operation of prison cell doors and their locks by power and manually; an operating mechanism for each door having its elements mounted on a main supporting member and comprising; an operating slide and a door slide supported for both joint and independent sliding movement; an electric motor and non-reversible gearing for reciprocating said operating slide; coupling means disengageable in any position of said slides and automatically re-engaged when said slides assume corresponding positions for operatively connecting said slides together with a relative lost motion in the closed position of the door only; a lock bolt for the door; separate cam members attached to the respective slides for operating said lock bolt to and holding it in an unlocked position during a predetermined portion of the movement of said door near its closed position; means for controlling said electric motors from a central point; a vertically movable lift bar for operating said coupling means to disconnect said operating slide and said door slide entirely, release means for raising said lift bar to disengage said coupling means and also operate said lock bolt to its unlocking position, a portable hand key device, a key hole for each door rendering said release means accessible for operation by said hand key device; and a single master release bar manually operable from said central point for when operated either opening the key hole covers for the key holes of all the doors or unlocking all of said doors and disconnecting all door slides from their respective operating slides.

27. In a system for locking and operating prison cell doors, a unitary power mechanism for each door enclosed within a casing above the door, said mechanism comprising an operating slide, an electric motor and non-reversible gearing for reciprocating said operating slide, disengageable coupling means operatively connecting said slide to the door, release means within the casing above the door for operating said coupling means in any position of the door to disconnect it from its power driven slide and permit manual movement thereof, a portable hand key device, said release means including an element adapted to be operated by said hand key device, manually operable control means at a remote control point for governing the power operation of said power mechanisms for said doors individually or in selected groups, and a master slide bar operable manually from said remote control point and acting when moved to different positions to prevent or permit operation of said release means for any one of the doors by said hand key device only and without otherwise exposing the power mechanisms for manual manipulation.

28. A unitary power mechanism for locking and operating prison cell doors comprising, a door slide and an operating slide mounted for simultaneous and independent sliding movement within a casing above the door, a reversible electric motor and non-reversible gearing for reciprocating said operating slide, a coupling member for at times operatively connecting said operating slide with said door slide, means including a vertically movable lift bar extending above the door substantially throughout its length for disengaging said coupling member from said door slide in any position of the door slide and thereby free the door from its operating mechanism for manual movement, said coupling member after disengagement from said door slide being automatically re-engaged when the door slide and operating slide assume their normal relative positions, a vertically movable lock bolt engageable with a staple fixed to the door, a lock bolt actuator movably supported within said casing, means moving with said door slide for engaging with said lock bolt actuator to lift and then release the lock bolt during a predetermined portion of the closing movement of the door either by hand or power, means associated with said operating slide and effective during its initial opening movement to engage with said lock bolt actuator to unlock the doors for power operation, and manually operable means for simultaneously operating said lock bolt actuator to its unlocking position and raising said lift bar so as to free the door for hand operation in any of its positions.

29. A unitary power mechanism for operating and locking prison cell doors comprising, an operating slide, an electric motor and non-reversible gearing for moving said operating slide in opposite directions, coupling means for operatively connecting said operating slide to the door with a limited amount of lost motion of the slide relative to the door in its closed position, said coupling means being disengageable to disconnect said operating slide from the door, a lock bolt engageable with a hole in a staple fixed to the door for locking the door in its closed position, an actuating member for lifting said lock bolt, manually operable means for simultaneously disengaging said coupling means and moving said actuating member to lift said lock bolt, thereby freeing the door in any position for hand operation thereof, means moving with the door and engaging said actuating member during the final closing movement of the door to move said lock bolt out of and then into engaging relation with said staple, and other means connected to said operating slide and engaging with said actuating member to lift the lock bolt during the initial lost motion opening movement of said operating slide with respect to the door, whereby the door is automatically unlocked and locked when opened and closed by power movement of the operating slide and is also automatically locked when closed by hand.

30. In a system for operating and locking prison cell doors, a unitary power mechanism for locking and moving each cell door and having its operating elements mounted on a main supporting member fastened to a vertical wall in an enclosed housing above the door, said operating elements comprising, an operating slide mounted for sliding movement, a reversible electric motor and nonreversible gearing controllable from a remote control point for reciprocating said operating slide, a lock bolt actuator operatively connected to a vertically movable lock bolt, cam members associated with said door and said operating slide respectively and both engaging and moving said lock bolt actuator to lift and hold the lock bolt in its unlocked position for a limited distance of travel of the door or said operating slide during its final closing movement, said cam member associated with said operating slide also operating said lock bolt actuator to lift and hold the lock bolt in its unlocking position for a limited distance of movement of said operating slide during its initial opening movement, coupling means disengageable in any position of the door for operatively connecting said operating slide to said door, said power mechanism for each door being releasable by a portable hand key device, and a slide bar manually movable from said remote control point and operable when moved from a normal position to one operated position to simultaneously operate said lock bolt actuator to its unlocking position and said coupling means to its disengaging position to free the door for hand operation, said slide bar when moved to another operated position being ineffective to operate said lock bolt actuator or said coupling means but rendering both operable by said hand key device only.

31. A unitary power mechanism for operating the lock bolt and opening and closing a sliding prison cell door comprising, an operating slide reciprocated by an electric motor and associated non-reversible gearing, a coupling member carried and positively driven by said operating slide but movable vertically and transversely to the direction of movement of said operating slide, means including a door slide connected to the door and having therein an opening and an adjoining recess to receive said coupling member for operatively connecting said operating slide to the door with a limited amount of relative lost motion in the door-closed position only, means responsive to the lost motion movement of the operating slide during its initial opening movement while the door is closed for releasing the lock bolt for the door, and release means manually operable to move said coupling member to free the door in any position entirely from said operating slide, whereby the operating slide has a lost motion movement relative to the door in its closed position for the purpose of releasing the lock bolt but is positively connected to the door at other times unless said release means has been operated.

32. In a system for operating a number of prison cell doors each having lock bolts, a unitary power mechanism for each door comprising, an operating slide driven by a reversible electric motor for operating the lock bolt near the closed position of the door to lock and unlock it and for moving the door by power to the open or closed position, a closing control circuit and an opening control circuit for each motor, a control panel at a remote control point, an individual control switch for each door on said panel operable to and remaining in any one of three positions, said individual control switch in one position energizing the closing control circuit for the motor of the corresponding door and in another position energizing the opening control circuit for that motor, a master switch operable to and remaining in either a door opening or a door closing position, each individual control switch when operated to its other third position connecting both control circuits for the associated motor to the master switch to be energized respectively dependent upon the position of the master switch, a limit switch included in each of said controlling circuits for each door and comprising a pivotally supported contactor biased to the circuit closing position, and actuating members carried by said operating slide and tilting said contactors to their circuit open position near the extreme positions of said operating slide only, each contactor assuming its biased circuit closing position when disengaged by said actuating members, whereby the doors may be operated by power individually or in a selected group and the motor of each power mechanism is automatically energized to restore the door to the fully open or closed position to correspond with the existing position of the control switches if said mechanism should be moved from the fully open or closed position.

33. In a centralized control system for the electrical control and indication of power operated doors of prison cells arranged in cell blocks, a unitary power mechanism for each door operable to actuate the lock bolt and move the door, said power mechanism including two separate indication contactors closed only if the door is closed and also locked, a control panel adjacent each cell block having thereon an indicating lamp for each cell of said such cell blocks, a circuit for lighting each indication lamp including one of the indication contactors for the corresponding door, an indicating circuit for each cell block including in series all of the other indication contactors of the doors of that cell block, a relay for each cell block located at a remote central point and energized by the corresponding indicating circuit, means at said remote central point for visually indicating the energized or deenergized condition of each of said relays, an alarm device responsive to the deenergization of any one of said relays, a cut-out switch for said alarm device, and manually operable means at said central control point controlling the supply of current to the power mechanisms and the individual indication lamps for all the doors of the several cell blocks without removing current from the series indicating circuits and relays for the several cell blocks.

34. In a system for the joint operation of a plurality of prison cell doors and their locks by power and manually, a power mechanism for each door comprising an operating slide reciprocated by an electric motor and associated non-reversible gearing, coupling means for operatively connecting said operating slide to the door with relative lost motion only when said operating slide has moved the door to the closed position, a lift bar for operating said coupling means to dis-engage said operating slide from said door entirely in any of its positions, a lock bolt for the door, a lock bolt actuator connected to said lock bolt, separate means associated with said operating slide and the door for lifting said lock bolt during the initial opening movement of said operating slide and the final closing movement of the door respectively, control means including a master switch and a plurality of individual control switches one for each door at a remote control point for governing the operation of said motors to open or close the doors individually or simultaneously in any selected group, release means manually operable from said remote control point and also by a portable hand key device at a point adjacent each door for concurrently operating said lift bar and said lock bolt actuated to free the door in any of its positions for hand operation, and means manually operable from said remote control point for operating said lift bar to free only the door or doors held in the open position by said power mechanism.

35. In a system for the power operation of prison cell doors from a remote control point and the indication at said control point of the closed and locked condition of each door individually, the combination with a vertical movable lock bolt for a door and a cam member fixed to the door, of a pivotally supported first member tilted by said cam member only when the door is in its closed position, a second member wholly supported by a pivotal connection with said first member and with said lock bolt, said second member assuming a predetermined position only when the door is closed and said lock bolt is in its locking position, circuit controlling means closed by said second member in said predetermined position only, and an indicating circuit including said circuit controlling means for lighting an indicating lamp at said remote control point.

36. In a system for the power operation of prison cell doors individually or in any selected group, comprising in combination with a unitary power mechanism for each door including a reversible electric motor for operating the lock and moving the door to its open or closed position, an opening control wire and a closing control wire for each motor, a limit switch in each of said control wires closed except when the associated door is in the corresponding fully open or closed position, a control panel at a remote control point, a two-position master switch and a plurality of three-position individual control switches one for each door mounted on said control panel, each of said switches remaining in the last operated position until changed, a source of current having a common return connection from one terminal to all of said motors, each individual control switch in its two extreme positions connecting the other terminal of said source to one or the other of the control wires for the corresponding motor and in its middle position connecting both of these control wires to contacts of the master switch, said master switch having a separate pair of opening and closing contacts for each door for connecting said other terminal of said source to one or the other of said control wires for the corresponding door when its individual control switch is in the middle position, whereby the operating circuits for the motors may be energized to open or close any selected door or doors, or reverse their movement in mid-position, but are maintained energized in accordance with the manipulation of said switches until the corresponding door assumes its fully opened or closed position to open the corresponding limit switch.

37. A power operating mechanism for sliding prison cell doors comprising, a door slide and an operating slide mounted above the door for simultaneous or independent movement substantially parallel with the direction of movement of the door, a reversible electric motor and non-reversible gearing controllable from a remote control point for reciprocating said operating slide, said door slide extending substantially throughout the distance of travel of the door, a coupling member carried by said operating slide and movable relatively thereto into and out of co-operating relation with a recess in the door slide for operatively connecting and disconnecting said operating slide with the door slide, manually operable means for actuating said coupling member to disconnect said operating slide from said door slide and permit their independent movement, said coupling member resting on the door slide when it is displaced in one direction relative to the operating slide and being automatically re-engaged with its co-operating recess when the door slide and operating slide assume corresponding positions, and means on said door slide for raising said coupling member into position to automatically re-engage with its co-operating recess when the door slide is brought into a corresponding position with the operating slide after having been displaced therefrom in the other direction.

38. In a system for operating prison cell doors, a unitary power operating mechanism including a reversible electric motor and non-reversible gearing for unlocking and moving the door to its open position and moving the door to its closed position and locking it, control means including a master switch and individual control switches one for each door located at a remote control point for governing said motors of the power mechanisms for the several doors individually or simultaneously in any selected group, disengageable coupling means including a movable coupling member driven by said motor and co-operating with a recess associated with said doors for operatively connecting said operating mechanism with said door, means including a master slide bar manually operable from said remote control point for disengaging said coupling means for the several doors simultaneously, a hand key device, other manually operable means controlled from said remote control point for at times permitting and at other times preventing said hand key device to be used to disengage said coupling member for any selected door and also unlock that door to permit opening and closing thereof by hand, and cam means associated with said door for operating said coupling member to permit automatic re-engagement thereof with its cooperating recess when the door is closed by hand while the operating mechanism is in its door closing position, whereby in addition to independent and group operation of the doors by their power mechanism, any selected door may be locally freed and opened by hand while other doors are left closed, and upon hand closing of this selected door it is automatically coupled to its operating mechanism ready for subsequent power operation.

39. In a system for operating prison cell doors, a unitary power mechanism for each door comprising, an operating slide, a reversible electric motor and non-reversible gearing controlled from a remote control point for reciprocating said slide, a lock bolt actuator connected to the lock bolt for the door, means responsive to the initial opening movement of said operating slide for operating said lock bolt actuator to move the lock bolt to its unlocking position, means moving with the door to raise and then release said lock bolt actuator to lock the door when it is closed by hand independently of the operating slide, disengageable coupling means operatively connecting said operating slide with said door with a limited amount of relative lost motion in the door closed position only, a lift bar extending substantially throughout the distance of travel of the door for disengaging said coupling means in any position of the door, release means including a shaft extending transversely to the direction of movement of the door and operable upon rocking of said shaft to actuate said lift bar to disengage said coupling means and also raise said lock bolt actuator to unlock the door, a portable hand key device, and means manually operable from said remote control point for permitting or preventing said shaft for each door being turned by the hand key device and for turning said shaft of said release means for all of the doors simultaneously.

40. In a system for the power and manual operation of prison cell doors, a unitary power operating mechanism for each door comprising, an operating slide mounted above the door for movement substantially parallel with the direction of movement of the door, a reversible electric motor and non-reversible gearing for reciprocating said operating slide, a movable coupling member driven by said operating slide and biased to assume a position for operatively connecting said operating slide to the door, cam means on said operating slide capable of operating said coupling member from its biased position only when said operating slide is in its extreme door opening position, means manually operable from a remote control point for rendering said cam means for all doors effective or noneffective, and control means including a master switch and individual control switches one for each door located at said remote control point for governing the operation of the motors for the several doors individually or simultaneously in any selected group, whereby a door or doors that has been opened by its power operating mechanism may be left held open by that mechanism or freed therefrom for hand closing at the will of the operator by manual control from said remote control point without affecting any door then closed.

41. In a system for locking and operating prison cell doors, a unitary power mechanism for each door including a reversible electric motor and means driven thereby for automatically operating the lock bolt of the door and moving the door to either its closed or open position, said motors each having opening and closing control circuits for causing operation thereof to open or close the door, a master switch at a remote control point manually operable to a door opening and a door closing position, a plurality of manually operable individual control switches one for each door located at the same remote control point and remaining in the position last operated for the desired control until subsequently changed, each of said individual control switches being operable to render the energization of the motor control circuits for the corresponding door dependent upon the operated position of said master switch, whereby any plurality of doors may be selected by positioning the corresponding individual control switches as a group to be simultaneously opened or closed by the master switch, each of said individual control switches being also operable to control the energization of the associated motor control circuits to open or close the corresponding door by itself independently of the operated position of the master switch and the individual control switches for all other doors, whereby any selected door may be opened or closed by itself in response to the manipulation of the corresponding individual control switch while any selected group of doors is subject to simultaneous operation by manipulation of the master switch.

42. In a system for operating and locking prison cell doors, a unitary power mechanism for each door comprising, an operating slide mounted above the door for sliding movement, an electric motor and non-reversible gearing for reciprocating said operating slide, disengageable coupling means operatively connecting said slide with the door for both opening and closing movement of the door, said coupling means being automatically re-engageable when said operating slide and door assume a predetermined relative position after having been moved out of such position, a lock bolt for the door automatically actuated by the door and by said operating slide during the final closing movement and by the operating slide only during initial opening movements of the door, means including manually operable circuit controlling devices at a distant control point for governing the energization of the motors of said power mechanisms to open or close any selected group of doors simultaneously or any selected door individually, release means for each door adjacent thereto operable manually by a key device to disengage said coupling means and also operate the lock bolt to its unlocking position, and other means manually operable from said remote control point for simultaneously operating said release means for all of the doors, whereby any individual door or selected group of doors may be opened or closed by remote control of the power mechanism and any individual door or all of the doors may be unlocked and disconnected from their operating mechanisms for hand operation, without preventing subsequent operation of such hand-operated door by its power mechanism as soon as the door and power mechanism are brought into corresponding relative positions.

43. A power mechanism for prison cell doors comprising, a main supporting member adapted to be secured to a vertical wall above the door and supporting the operating elements of the mechanism, said elements including an operating slide adapted to be reciprocated by an electric motor and gearing, and means operatively connecting the door to said operating slide and comprising a plate attached to the door-hangers and two separate opposing spring stops moving with said operating slide and contacting with opposite edges of said plate, said spring stops each including a spring under initial trapped compression and further compressed by movement of the door endwise in a corresponding direction relative to said operating slide, whereby the driving connection between the operating slide is resilient for forces exceeding the trapped pressure of said springs to absorb shocks and jars and allows free lateral movement of door both sidewise and vertically relative to the operating slide, thereby preventing binding in spite of variations in the alignment of the operating slide with respect to the track on which the door moves.

44. An operating unit for controlling by power the operation and locking of a prison cell door comprising, a sliding cell door, a lock bolt biased to its locked position for holding said door locked when in its closed position, door operating means movable substantially parallel to said door, a reversible electric motor for driving said operating means to a door-closed and a door-open position, separate opening and closing control circuits for said motor, manually operable means for controlling the energization of said control circuits, coupling means operatively connecting said operating means with the door and providing a limited amount of lost motion of said operating means relative to the door only when said operating means has moved the door to a closed position, release means manually operable by a portable key device from a point adjacent the door for operating said coupling means to free the door in any position entirely from said operating means, said coupling means being automatically re-engaged to couple said operating means to the door whenever said release means is restored to normal and thereafter the door and said operating means assumes corresponding positions, and means manually operable from a remote control point for permitting or preventing operation of said release means by said key device.

45. In a system for the remote control of power operated prison cell doors, a plurality of prison doors, a lock bolt for each door biased to its locked position, door operating means for each door, coupling means for each door biased to operatively connect the door to its operating means and effective whenever such door and operating means after being relatively displaced are brought into registration, a reversible electric motor and non-reversible gearing for operating each said operating means and the door when coupled thereto to the open and closed position and allowing such door to be locked by said lock bolt when it reaches the closed position, means manually operable from a distant control point for operating both the lock bolt and said coupling means from their biased position for all of the doors regardless of their position to free all doors for hand operation, manually operable electrical control means at said remote control point for governing the operation of said motors individually or simultaneously, and other means manually operable from said distant control point and effective with respect to a door only if that door has been moved by its operating means to its fully open position for operating said coupling means of that door from its biased position to free the door for hand closing and without affecting said coupling means for doors that are not fully open.

46. In a system for operating a number of prison cell doors each having a lock bolt, a unitary power mechanism for each door comprising a reversible single phase alternating current electric motor and means operated thereby for actuating the lock bolt of the door in its closed position to lock and unlock the door and for also moving the door by power to its open or closed position, an opening control circuit and a closing control circuit for energizing the field windings of each motor with currents differing in relative phase relation to cause rotation of the motor in opposite directions, means governed by the operation of each power mechanism to open said control circuits for its motor when said mechanism is in a corresponding open or closed position, a master switch at a remote control point manually operable to actuate separate opening and closing contacts belonging to each door, and a plurality of three-position individual switches one for each dor located at the same remote control point and remaining in each of its operated positions until changed, each of said individual switches being effective in a neutral position to connect both of the control circuits of the motor for the corresponding door to corresponding opening and closing contacts of said master switch, each of said individual switches acting in one operated position to energize the opening control circuit of the motor for the corresponding door and in another operated position to energize the closing control circuit for said motor, whereby said individual switches may be positioned to select any desired group of doors to be simultaneously opened or closed by manipulation of the master switch or may be used to open or close the corresponding door by itself independently of the master switch and all other individual switches.

47. In a system for locking and operating prison cell doors, a unitary power mechanism for each door including a reversible electric motor and means driven thereby for automatically operating the lock bolt of the door and moving the door to either its closed or open position, a source of current, said motors each having an opening and a closing control circuit for causing operation thereof to open or close the door by current from said source, a cabinet for said cell doors having a door, a master switch in said cabinet manually operable to a door opening and a door closing position, a plurality of manually operable individual control switches one for each door located in said cabinet and remaining in the position last operated for the desired control until subsequently changed, each of said individual control switches being operable to effect the energization of the motor control circuits from said source for the corresponding door dependent upon the operated position of said master switch, a cut-out switch for said cabinet for disconnecting said source of power from said master switch and said individual control switches when said cabinet door is closed, whereby any plurality of doors may be selected by positioning the corresponding individual control switches as a group to be simultaneously opened or closed by the master switch, each of said individual control switches being also operable to control the energization of the associated motor control circuits to open or close the corresponding door by itself independently of the operated position of the master switch and the individual control switches for all other doors, whereby any selected door may be opened or closed by itself in response to the manipulation of the corresponding individual control switch while any selected group of doors is subject to simultaneous operation by manipulation of the master switch and whereby said source of current is disconnected from said master and individual control switches when said panel door is closed.

48. In a system for locking and operating prison cell doors, a unitary power mechanism for each door including a reversible electric motor and means driven thereby for automatically operating the lock bolt of the door and moving the door to either its closed or open position, a source of current, said motors each having an opening and a closing control circuit for causing operation thereof to open or close the door by current from said source, a master switch at a remote control point manually operable to a door opening and a door closing position, a plurality of manually operable individual control switches one for each door located at the same remote control point and remaining in the position last operated for the desired control until subsequently changed, each of said individual control switches being operable to effect the energization of the motor control circuits from said source for the corresponding door dependent upon the operated position of said master switch, a warden's switch located remotely from said master and individual control switches and operable to a position to cut off said source of current from said master and individual control switches whereby any plurality of doors may be selected by positioning the corresponding individual control switches as a group to be simultaneously opened or closed by the master switch, each of said individual control switches being also operable to control the energization of the associated motor control circuits to open or close the corresponding door by itself independently of the operated position of the master switch and the individual control switches for all other doors, whereby any selected door may be opened or closed by itself in response to the manipulation of the corresponding individual control switch while any selected group of doors is subject to simultaneous operation by manipulation of the master switch and whereby said warden's switch may be operated to exercise supervisory control over said master and individual control switches.

OSCAR S. FIELD.